United States Patent [19]
Yamamoto et al.

[11] Patent Number: 5,469,940
[45] Date of Patent: Nov. 28, 1995

[54] RODLESS CYLINDER UNIT WITH BRAKE

[75] Inventors: Hitoshi Yamamoto; Kunihisa Kaneko; Masayuki Watanabe; Akio Kami, all of Yawara, Japan

[73] Assignee: SMC Corporation, Tokyo, Japan

[21] Appl. No.: 7,596

[22] Filed: Jan. 22, 1993

[30] Foreign Application Priority Data

Jan. 23, 1992 [JP] Japan .................. 4-006553 U
Sep. 3, 1992 [JP] Japan .................. 4-067541 U

[51] Int. Cl.⁶ .................................................. F01B 29/00
[52] U.S. Cl. .................................................. 188/67; 92/88
[58] Field of Search .......................... 188/170, 67, 43, 188/38, 40, 62; 92/88, 15, 18, 23, 27

[56] References Cited

U.S. PATENT DOCUMENTS

| | | | |
|---|---|---|---|
| 2,089,202 | 8/1937 | Gartin | 92/88 |
| 4,694,733 | 9/1987 | Green | 92/88 |
| 4,856,415 | 8/1989 | Noda | 92/88 |
| 5,205,204 | 4/1993 | Gottling et al. | 188/170 |

FOREIGN PATENT DOCUMENTS

| | | |
|---|---|---|
| 0136435 | 4/1985 | European Pat. Off. . |
| 0136436 | 4/1985 | European Pat. Off. . |
| 0467491 | 1/1992 | European Pat. Off. . |
| 2939153 | 4/1981 | Germany . |
| 3403830 | 10/1984 | Germany . |
| 3802703 | 8/1988 | Germany . |
| 2-163595 | 6/1990 | Japan . |
| 2-283991 | 11/1990 | Japan . |
| 2-143586 | 12/1990 | Japan . |

*Primary Examiner*—Matthew C. Graham
*Attorney, Agent, or Firm*—Brumbaugh, Graves, Donohue & Raymond

[57] ABSTRACT

In a rodless cylinder unit with brake, which comprises a sliding table slidably held on a cylinder tube, brake bands inserted into the sliding table and both ends thereof fixed on both ends of the cylinder tube, and the sliding table provided with a brake for squeezing the brake bands, a slit with open upper end is formed on a side of the rodless cylinder of the cylinder tube, an air supply tube is accommodated in the slit, one end of the air supply tube is connected to the sliding table, and the other end of the air supply tube is connected to an end of the cylinder tube. When the air for brake release is supplied to the brake through the air supply tube, the brake is released, and the sliding table becomes movable. When the sliding table is moved, the air supply tube accommodated in the slit is overlapped or not overlapped with very low friction depending upon the moving direction of the sliding table. When the air for brake release is discharged and the air for brake locking is supplied through the other air supply tube as necessary, braking force is generated, and the sliding table is stopped.

7 Claims, 18 Drawing Sheets

RODLESS CYLINDER UNIT WITH BRAKE

BACKGROUND OF THE INVENTION

The present invention relates to a rodless cylinder unit with brake for stopping sliding table and used for operating members of various types of machines.

The present inventors previously invented a rodless cylinder unit with brake as shown in FIGS. 24 to 26. The patent application was filed at the Japanese Patent Office on Feb. 22, 1991 and was received as the Japanese Patent Application No. 3-50508. Description is now given on a rodless cylinder unit with brake shown in FIGS. 24 to 26, which is not laid open and not known in the art before the application was filed. On both ends of a cylinder tube (main base) 1, a first head cover 4 and a second head cover 5 are mounted, and a slider 2 is slidably supported on the cylinder tube 1 through a guide. The slider 2 is moved by a rodless cylinder 35 of the cylinder tube 1. On top of the slider 2, a table 3 is mounted. Air chamber is formed on the table 3, and brake chambers 10 and 11 are provided on top of the slider 2 below the air chamber. Brake bands 8 and 9 are inserted into the brake chambers 10 and 11 and placed above the cylinder tube 1, and both ends of the brake bands 8 and 9 are fixed on the first head cover 4 and the second head cover 5. In the brake chambers 10 and 11, brake shoes 14 and 15 are mounted above and below the brake bands 8 and 9. On top surface of the upper brake shoe 14, a plate 200 is abutted, and the lower brake shoe 15 is fixed on bottom surface on the brake chambers 10 and 11. A diaphragm device 32 is provided in the air chamber, dividing the air chamber into an upper air chamber 25 and a lower air chamber 26. Between the diaphragm device 32 and top surface of the upper air chamber 25, springs 30 and 31 are provided, and the springs 30 and 31 apply downward resilient force on the diaphragm device 32. On lower surface of the diaphragm device 32, rods 201 and 202 are fixed, and lower end of the rods 201 and 202 are abutted on the plate 200. When the brake is released, the plate 200 is pushed upward by a return spring 203.

On both sides of lower portion of the rodless cylinder 35 in the cylinder tube 1, a passage 204 and a guide groove 205 are formed along the cylinder tube on almost the same horizontal plane. As shown in FIG. 25, the right end of the passage 204 is communicated with a passage 208 of the first head cover 4. A port 206 is provided on the right end of the passage 208, and the left end of the passage 204 is communicated with a U-shaped passage 207 in the second head cover 5. A hollow air supply piston 209 is slidably and airtightly inserted into the passage 204. One end of a flexible air tube 211 is connected to an air passage 210 of the air supply piston 209, and the air tube 211 extends into the guide groove 205 through the U-shaped passage 207. As shown in FIG. 24, an adaptor 212 with L-shaped cross-section is connected to left lower end of the slider 2, and one end of the adaptor 212 is inserted into the guide groove 205 on non-contact basis, and it moves in the guide 205 as the slider 2 is moved. A passage 213 is formed in the adaptor 212. One end of the passage 213 is communicated with the lower air chamber 26 through a passage 40 in the slider 2, and the other end of the passage 213 is connected to the other end of the air tube 211 through a joint 214. Thus, the lower air chamber 26 and the port 206 are communicated with each other.

In the conventional type rodless cylinder unit with brake not laid-open, an axial passage is provided in the cylinder tube as described above, and a tube for supplying and discharging pressure fluid is provided in this passage along axial direction of the cylinder tube. One end of the tube is connected to the sliding table, and the other end of the tube is mounted on the air supply piston, which is closely slided in said passage. Therefore, it is disadvantageous in that a passage for providing the tube is required and that friction occurs when the tube and the air supply piston are slided in the passage. Also, the position of the air supply piston changes according to the position of the sliding table, and the length of the passage for air supply also varies. The time required from operation of directional control valve for air supply up to the arrival of the air to the brake of the rodless cylinder varies according to the position of the sliding table.

Also, in the conventional type rodless cylinder unit with brake, brake is maintained in release state during initial adjustment of the rodless cylinder unit with brake, and the air under pressure higher than a predetermined pressure value must be continuously supplied to the air chamber in the sliding table. This results in waste of energy when long time is required for initial adjustment of rodless cylinder with brake. Also, there is restriction in terms of operation because the air is continuously supplied to the air chamber.

SUMMARY OF THE INVENTION

It is a first object of the present invention to provide a rodless cylinder unit with brake using an air supply tube, in which the tube for air supply does not go out of the rodless cylinder unit with brake, the length of the passage for air supply from directional control valve to the brake does not change according to the position of a sliding table, the time from the operation of the directional control valve to the supply of the air to the brake is always constant, and cylinder unit is designed in simple structure and with less friction.

It is a second object of the invention to provide a rodless cylinder unit with brake using an air supply tube, in which it is possible to maintain the brake in released state during initial adjustment of the rodless cylinder unit with brake without requiring continuous supply of the air under pressure higher than the predetermined pressure value to the air chamber in the sliding table.

To attain the above objects, a rodless cylinder unit with brake according to the present invention comprises a sliding table slidably supported on a cylinder tube, brake bands inserted into the sliding table and both ends of the bands are fixed on both ends of the cylinder tube, and a brake is provided in the sliding table for squeezing the brake bands, and it is characterized in that a slit with open upper end is formed on a side of the rodless cylinder of the cylinder tube, and an air supply tube is accommodated in the slit, and one end of the air supply tube is connected to the sliding table and the other end of the air supply cylinder is connected to an end of the cylinder tube. When the air for brake release is supplied through the air supply tube to the brake, the brake is released, and the sliding table becomes movable. When the sliding table is moved, the air supply tube accommodated in the slit moves with very low friction along the moving direction of the sliding table. When the air for brake release is discharged and the air for brake locking is supplied through the other air supply tube as necessary, braking force is generated, and the sliding table is stopped.

Also, the rodless cylinder unit with brake of the present invention is characterized in that a manual plate is rotatably mounted in the sliding table, the manual plate is provided with hooks, a brake holder in the sliding table is provided with annular engagement grooves, and the hooks of the manual plate and the annular engagement grooves of the brake holder can be engaged with each other. When the brake is released in conventional manner and the manual plate is rotated, the hooks of the manual plate are engaged with the annular engagement grooves of the brake holder. By this engagement, the movement of the brake holder is stopped.

In the present invention, a slit with an open upper end is formed on the side of the rodless cylinder of the cylinder tube. An air supply tube is accommodated in the slit, and one end of the air supply tube is connected to the sliding table, and the other end of the air supply tube is connected to an end of the cylinder tube. Therefore, it is safe and gives good external appearance because the air supply tube is not exposed outside. An air tube holder provided with a first guide roller and a second guide roller is arranged in the slit. The tube for supply is abutted on outer peripheral surface of the first guide roller, and wire is abutted on outer peripheral surface of the second guide roller. One end of the wire is connected to the sliding table, and the other end of the wire is connected to the other end of the cylinder tube. Thus, the air supply tube does not jump out of the slit. Because the air supply tube is accommodated in the slit, it is simple in construction and can be produced at low cost. Moreover, the friction generated during movement of the sliding table is very low, and this results in high durability of the air supply tube. In the present invention, the air supply tube has a constant length, the length of the passage for air supply from directional control valve to brake is constant and does not vary according to the position of the sliding table. Thus, the time from the operation of the directional control valve to air supply is always constant. Therefore, it is easily achieved to stop the sliding table accurately at a desired position.

Also, in the present invention, the air under pressure higher than a predetermined pressure is supplied to the air chamber to release brake as in the conventional manner during initial adjustment of the cylinder. When manual plate is rotated under this condition, the hooks of the manual plate and the annular engagement grooves of the brake holder are engaged with each other. By this engagement, the movement of the brake holder is stopped, and even when air supply to the air chamber is stopped, the brake is maintained in released state. As the result, waste of energy is prevented, and the safety of the operation is increased during initial adjustment of the cylinder.

BRIEF DESCRIPTION OF THE DRAWINGS

In FIG. 3 to FIG. 7, brake in locked state is shown on left half of the figure, and the brake in released state is given on the right half;

FIG. 22 (b) is a partial cross-sectional side view of an air tube holder;

DETAILED DESCRIPTION OF THE PREFERRED EMBODIMENTS

Figure 1:
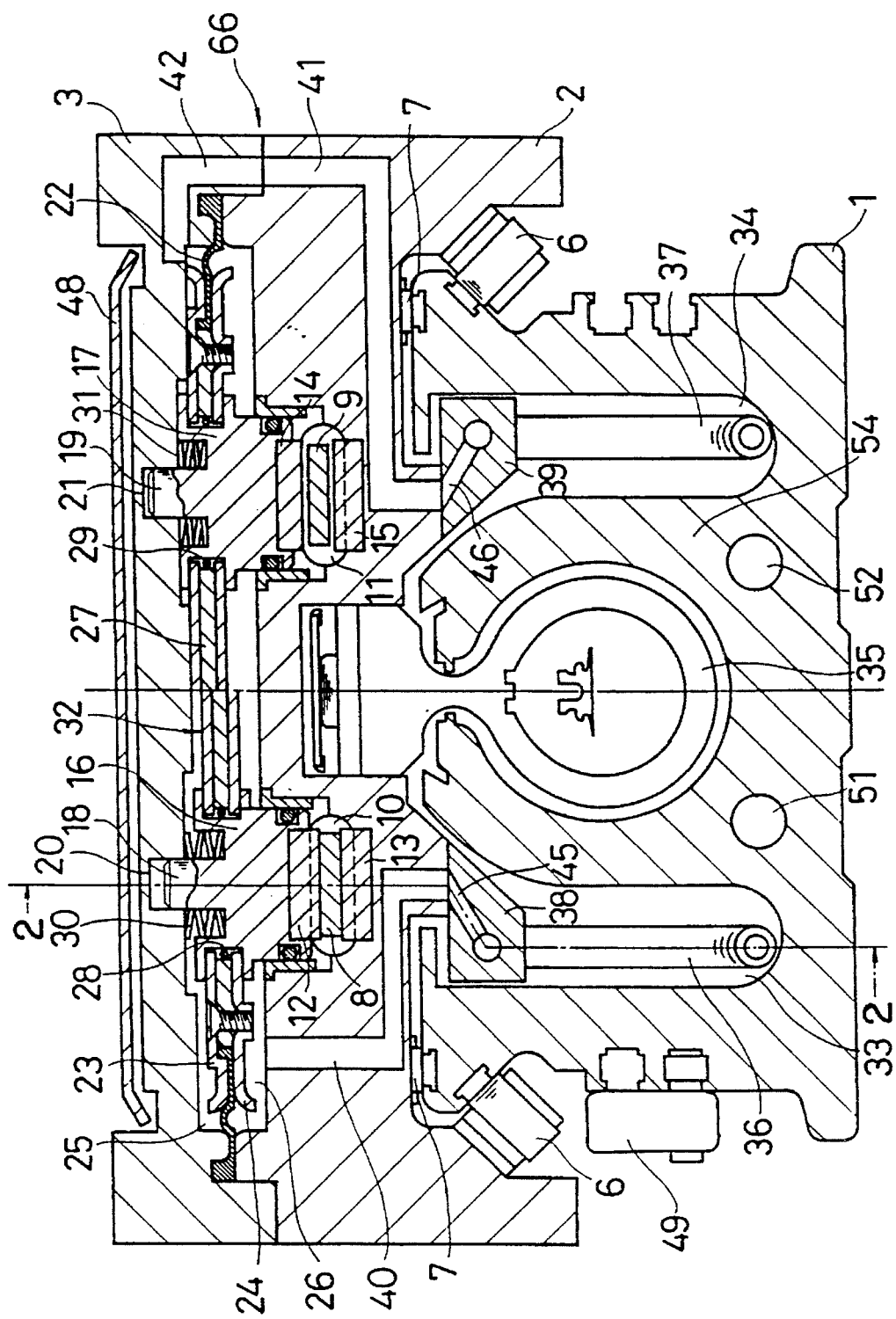
FIG. 1 is a longitudinal cross-sectional side view of a rodless cylinder unit with brake of a first embodiment of the present invention, where brake in locked state is shown at left, and the brake in released state is shown at right.
Figure 2:
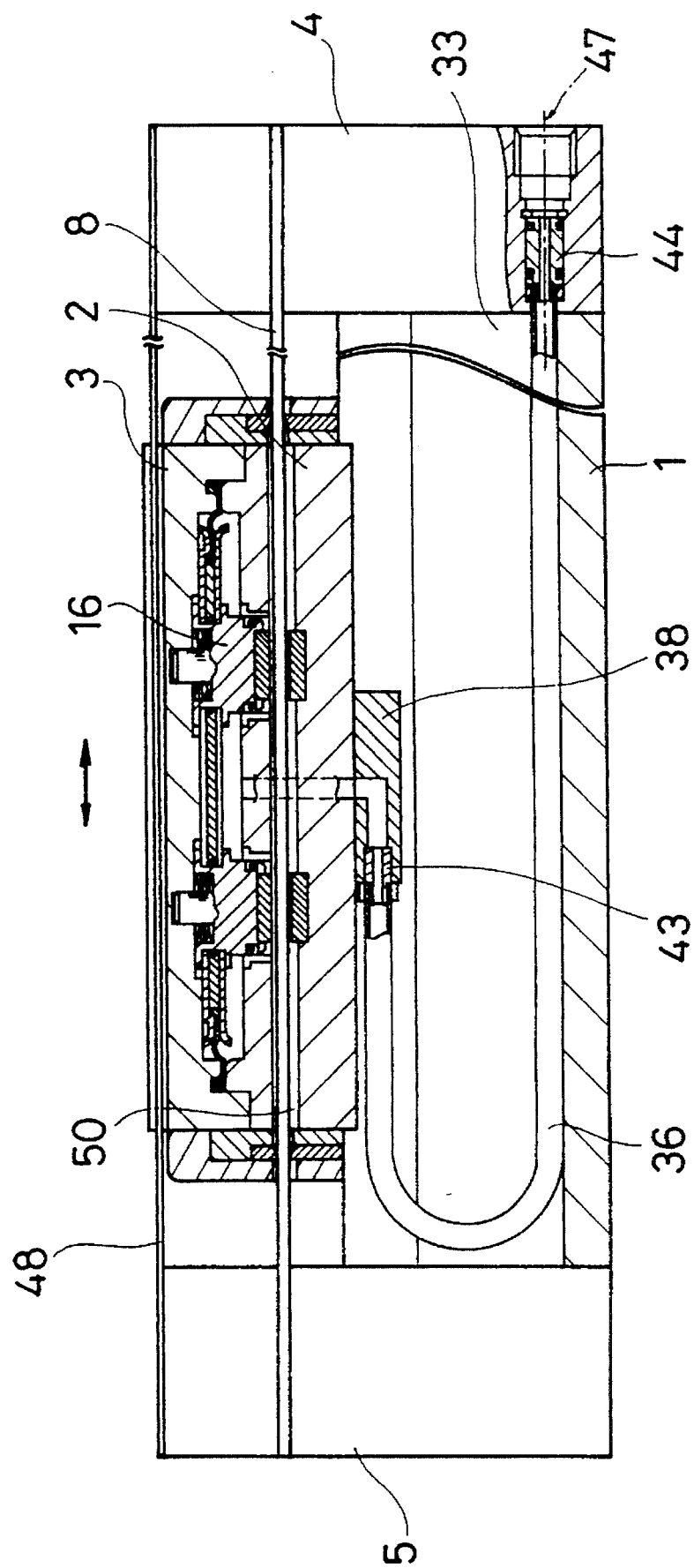
FIG. 2 is a cross-sectional view along the line 2—2 of FIG. 1, showing the brake in released state.

Description is now given on the rodless cylinder unit with brake of a first embodiment of the invention, referring to FIG. 1 and FIG. 2. On both ends of a cylinder tube (main base), a first head cover 4 and a second head cover 5 are mounted. On the cylinder tube 1, a slider 2 is slidably supported through guides 6 and 7, and the slider 2 is moved by a rodless cylinder 35 of the cylinder tube 1. A table 3 is provided on top of the slider 2. Air chambers (upper air chamber 25 and lower air chamber 26) are formed between the slider 2 and the table 3, and brake chambers 10 and 11 (two chambers each; 4 chambers in total) are formed on upper surface of the slider 2 at the point to be communicated with the air chambers. An assembly of the slider 2 and the table 3 may be called as a sliding table 66.

Brake bands 8 and 9 are inserted brake chambers 10 and 11 of the sliding table 66 and into a brake band passage 50 and are arranged above the cylinder tube 1, and both ends of the brake shoes 8 and 9 are fixed on a first head cover 4 and a second head cover 5. In the brake chambers 10 and 11, a pair of brake shoes 12–13 and 14–15 are furnished respectively above and below the brake bands 8 and 9. The upper brake shoes 12 and 14 are mounted on brake holders 16 and 17, and lower brake shoes 13 and 15 are fixed on bottom surface of the brake chambers 10 and 11. The lower portions of the brake holders 16 and 17 are slidably and airtightly engaged in recesses of the slider 2. Spring holders 18 and 19 on upper portions of the brake holders 16 and 17 are slidably engaged in recesses 20 and 21 of the table 3, so that the brake holders 16 and 17 are not deviated or become unstable. An outer periphery of a diaphragm 22 mounted in the air chamber is squeezed between the slider 2 and the table 3, and inner periphery of the diaphragm 22 is squeezed together with a shell plate 27 by two diaphragm shells 23 and 24 using screws. In annular grooves 28 and 29 on upper portions of the brake holders 16 and 17, peripheral edges of a laminated body of diaphragm shell 23, shell plate 27, and diaphragm shell 24 are engaged, and the gaps between these components are sealed. By a diaphragm device 32, comprising a diaphragm 22, said laminated body, and brake holders 16 and 17, the air chamber is partitioned into an upper air chamber 25 and a lower air chamber 26. On upper surface of the brake holders 16 and 17, annular grooves are formed, and springs 30 and 31 are inserted into the annular grooves. Upper ends of the springs 30 and 31 are brought into contact with upper surface of the upper air chamber 25, and the springs 30 and 31 apply downward resilient force on the diaphragm device 32. Thus, a brake is provided.

On both sides in longitudinal direction of the rodless cylinder 35 in the cylinder tube 1, elongated slits 33 and 34 with open upper ends are formed along the cylinder tube 1. The portion between the slits 33 and 34 serves as a driving member 54, and a first air supply tube 36 and a second air supply tube 37 are accommodated in the slits 33 and 34. On lower surface of the slider 2 protruding into the slits 33 and 34, joints 38 and 39 are connected respectively. A passage 40 for communicating a passage 45 in the joint 38 with the lower air chamber 26 is formed on the slider 2, and passages 41 and 42 for communicating a passage 46 in the joint 39 with the upper air chamber 25 are provided on the slider 2 and the table 3. One end of the first air supply tube 36 is connected to the passage 45 in the joint 38 using a coupling 43, and the other of the first air supply tube 36 is connected to an air inlet 47 of the first head cover 4 using a coupling 44. Similarly, one end of the second air supply tube 37 is connected to the passage 46 in the joint 39 using a coupling, and the other end of the second air supply tube is connected to an air inlet (not shown) of the first head cover 4 using a coupling (not shown). Most of the upper surface of the table 3, the first head cover 4, and the second head cover 5 are covered by a cover 48, and a plurality of position detectors 49 for detecting position of the slider 2 are arranged on a side of the cylinder tube 1. On lower portion of the cylinder tube 10, air passages 51 and 52 for supplying the air to the rodless cylinder 35 are provided.

When the air is introduced into the lower air chamber 26 through the air inlet 47, the first air supply tube 36, and the passages 45 and 40 by operating a directional control valve (not shown) to discharge the air in the upper air chamber 25, the diaphragm mechanism 32 moves upward against resilient force of the springs 30 and 31. Thus, the brake is turned to released state as shown on the right half of FIG. 1. When the rodless cylinder 35 is operated at the same time or after the operation of the directional control valve, the sliding table 66 moves over the cylinder tube 1. To stop the movement of the sliding table 66, the operation of the rodless cylinder 35 is stopped, and the air in the lower air chamber 26 is discharged by operating the directional control valve. The air is introduced into the upper air chamber 25 through the air inlet (not shown), the second air supply tube 37, the passage 46, and the passages 41 and 42. By the force generated by air pressure applied on upper surface of the diaphragm device 32 and by resilient force of the springs 30 and 31, brake holders 16 and 17 move downward, and brake bands 8 and 9 are squeezed (by strong power) by each pair of brake shoes 12–13 and 14–15. Thus, braking force is generated, and the sliding table 66 is stopped, turning the brake to locked state as shown on the left half of FIG. 1. This condition is maintained by resilient force of the springs 30 and 31 even when the air in the upper air chamber 25 is discharged. In this example, the air is supplied into the upper air chamber 25 for braking operation (pressure braking), while the supply of the air to the upper air chamber 25 may be omitted by increasing resilient force of the springs 30 and 31 (exhaust braking).

By the simple arrangement that the first air supply tube 36 and the second air supply tube 37 are accommodated in the slits 33 and 34, the first air supply tube 36 and the second air supply tube 37 are not exposed outside, the air to the braking unit can be supplied in safe manner. Also, regardless of the position of the sliding table 66 on the cylinder tube 1, the length of the air passage from the air inlet 47 to the lower air chamber 26 (from directional control valve to the lower air chamber 26) and the length of the air passage from the air inlet (not shown) to the upper air chamber 25 (from directional control valve to the upper air chamber 25) are constant. Therefore, the time from the operation of the directional control valve to the generation and release of braking force is always constant regardless of the position of the sliding table 66.

Figure 3:
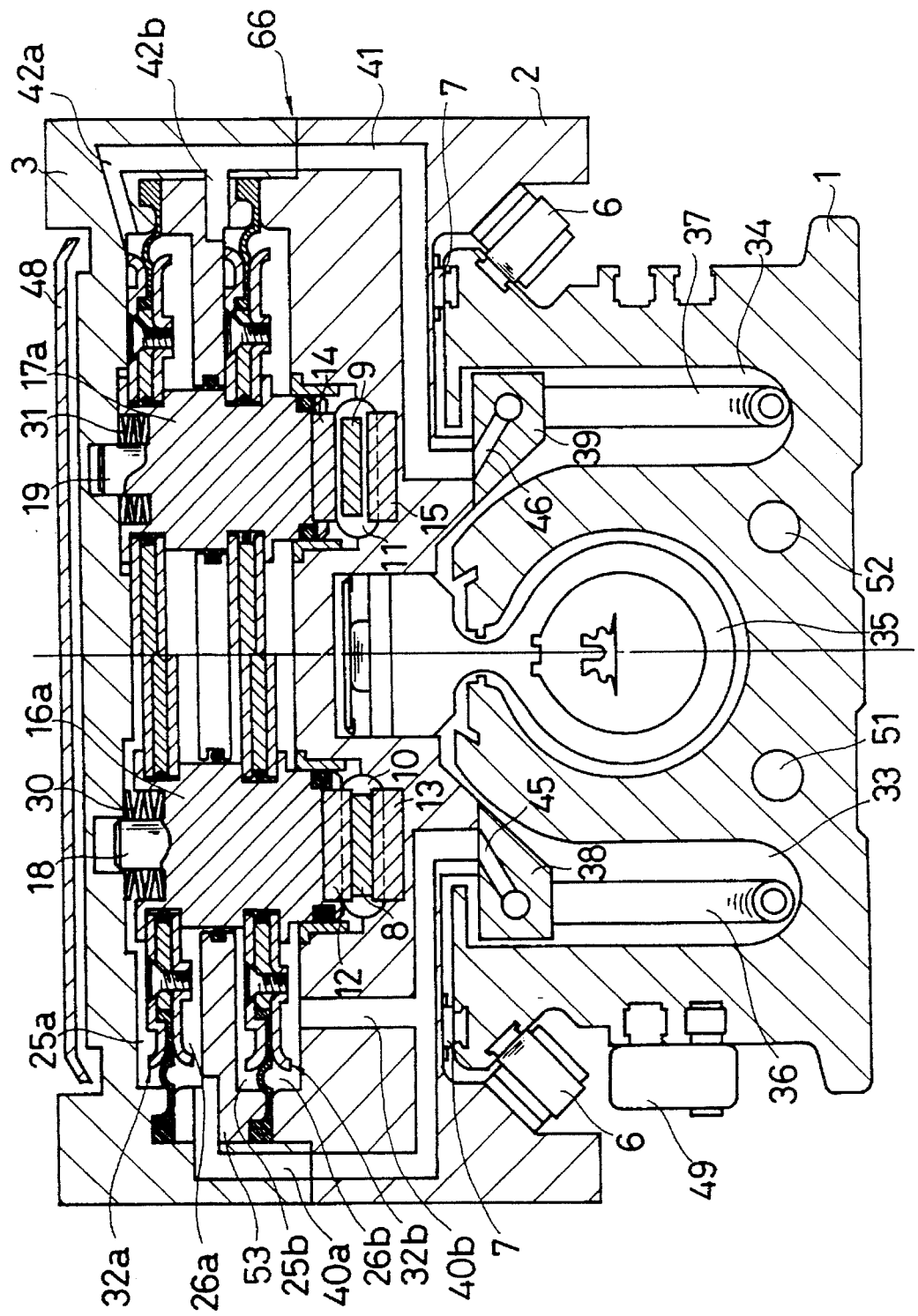
FIG. 3 is a longitudinal cross-sectional side view of a second embodiment of the present invention.

Referring to FIG. 3, description is now given on the rodless cylinder unit with brake of a second embodiment of the present invention. The second embodiment of the invention is characterized in that diaphragm devices are provided one each above and below.

In a space formed between the slider 2 and the table 3 (which is the air chamber in the first embodiment), a diaphragm device 32a, a plate 53, and a diaphragm device 32b are inserted, and these are squeezed by the slider 2 and the table 3. Brake holders 16a and 17a are inserted into 4 holes of the plate 53 under airtight condition, and the diaphragm device 32a is connected to upper annular grooves of the brake holders 16a and 17a, and the diaphragm device 32b is connected to lower annular grooves of the brake holders 16a and 17a under airtight condition as in the case of the first embodiment. In this way, the air chamber above the plate 53 is divided into an upper air chamber 25a and a lower air chamber 26a by the diaphragm device 32a, and the air chamber below the plate 53 is divided into an upper air chamber 25b and a lower air chamber 26b by the diaphragm device 32b. The lower air chambers 26a and 26b are communicated with a passage 45 of a joint 38 through passages 40a and 40b, and the upper air chambers 25a and 25b are communicated with a passage 41 and a passage 46 of a joint 39 through passages 42a and 42b. Upper and lower ends of the brake holders 16a and 17a are designed in the same manner as in the brake holders 16 and 17 of the first embodiment. In the other aspects, the second embodiment of the invention has the same arrangement as the first embodiment. Thus, the same component is referred by the same symbol as in the first embodiment in FIG. 3, and detailed description is not given here.

In the second embodiment of the invention, there are two diaphragm devices, and pressure receiving area of the diaphragm devices is about two times as much as that of the first embodiment. Accordingly, it is possible to operate brake with the air of lower pressure than in the first embodiment, and this contributes to higher safety and energy-saving.

Figure 4:
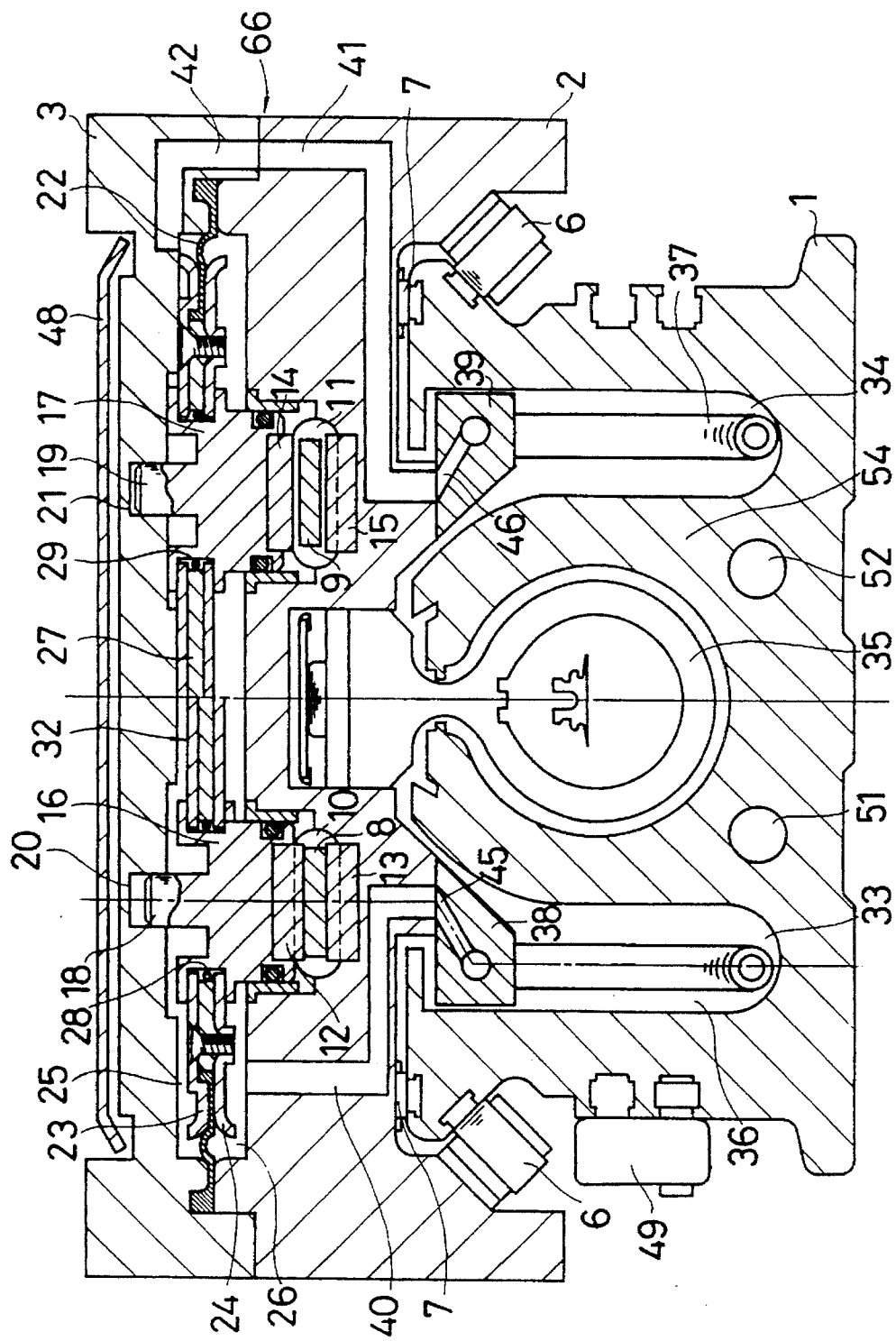
FIG. 4 is a longitudinal cross-sectional side view of a third embodiment of the invention.

Referring to FIG. 4, description is now given on the rodless cylinder unit with brake of a third embodiment of the invention. In the third embodiment, springs 30 and 31 are not present, which push the diaphragm device 32 downward. The other arrangement of the third embodiment is the same as the first embodiment, and the same component is referred by the same symbol in FIG. 4, and detailed description is not given here. When braking force is generated by brake in the third embodiment, it is necessary to supply the air into the upper air chamber 25.

Figure 5:
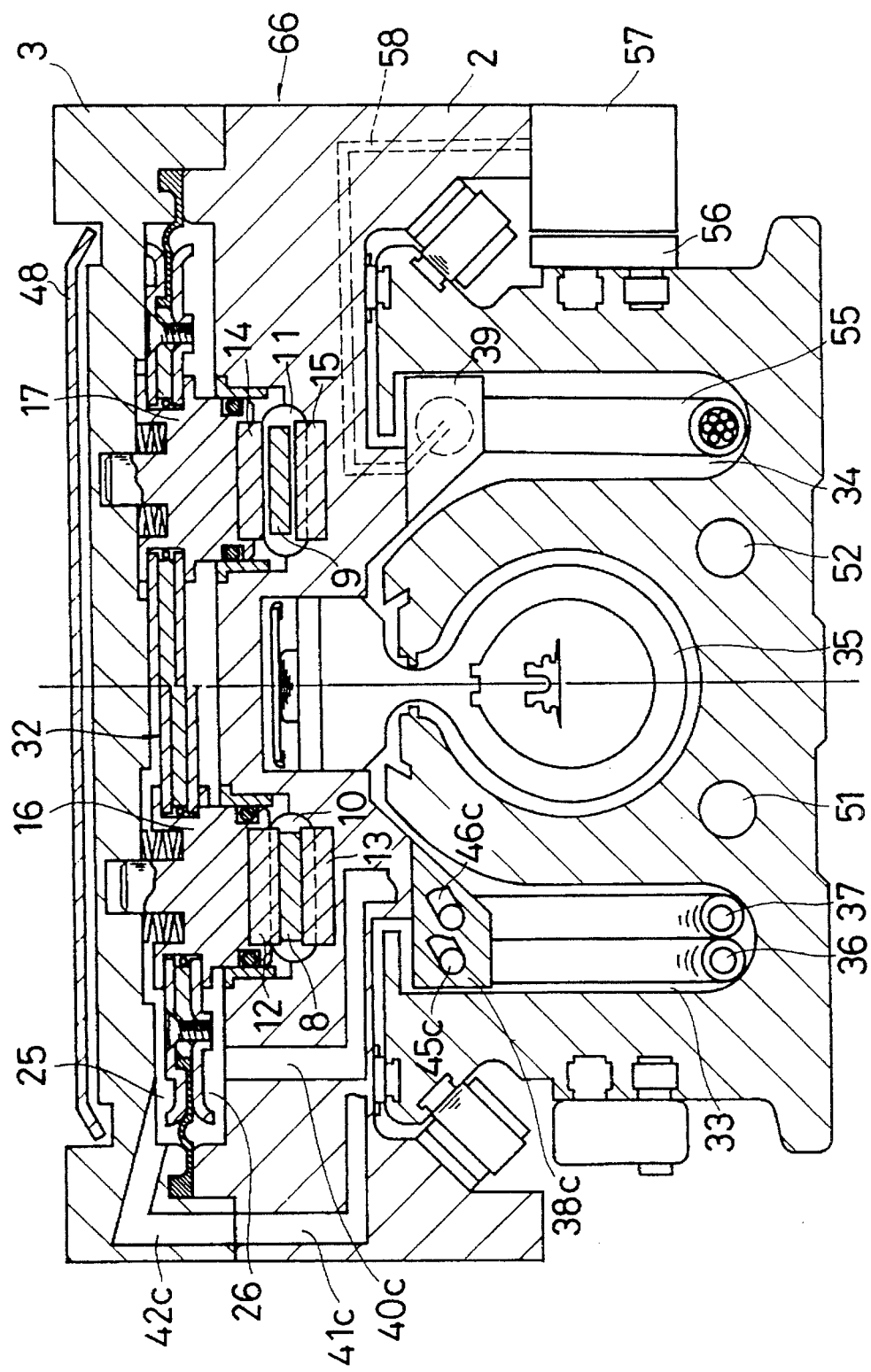
FIG. 5 is a longitudinal cross-sectional side view of a fourth embodiment of the present invention.

Using FIG. 5, description is given on the rodless cylinder unit with brake of a fourth embodiment of the present invention. The fourth embodiment is characterized in that the first air supply tube 36 and the second air supply tube 37 are accommodated in a slit 33, and a transmission cable 55 is accommodated in a slit 34.

Each end of the first air supply tube 36 and the second air supply tube 37 accommodated in the slit 33 is communicated to passages 45c and 46c of a joint 38c. The passage 45c is communicated with the lower air chamber 26 through a passage 40c of the slider 2. The passage 46c is communicated to the upper air chamber 25 through a passage 41c of the slider 2 and a passage 42c of the table 3. On the side of the cylinder tube 1 (on the right in FIG. 5), a planar scale 56 is provided, and a stroke sensor 57 is connected on lower end of one side of the slider 2 (right side in FIG. 5), and detecting element of the stroke sensor 57 is placed face-to-face to the scale 56. Various cords of the transmission cable 55 accommodated in the slit 34 are connected to the stroke sensor 57 through wiring 58. In the other aspects, the fourth embodiment has the same arrangement as in the first embodiment. Thus, the same component is referred by the same symbol in FIG. 5, and detailed description is not given here. In the fourth embodiment, it is possible to obtain information on the positions of the slider 2 and the table 3 based on the signal detected by the stroke sensor 57.

Figure 6:
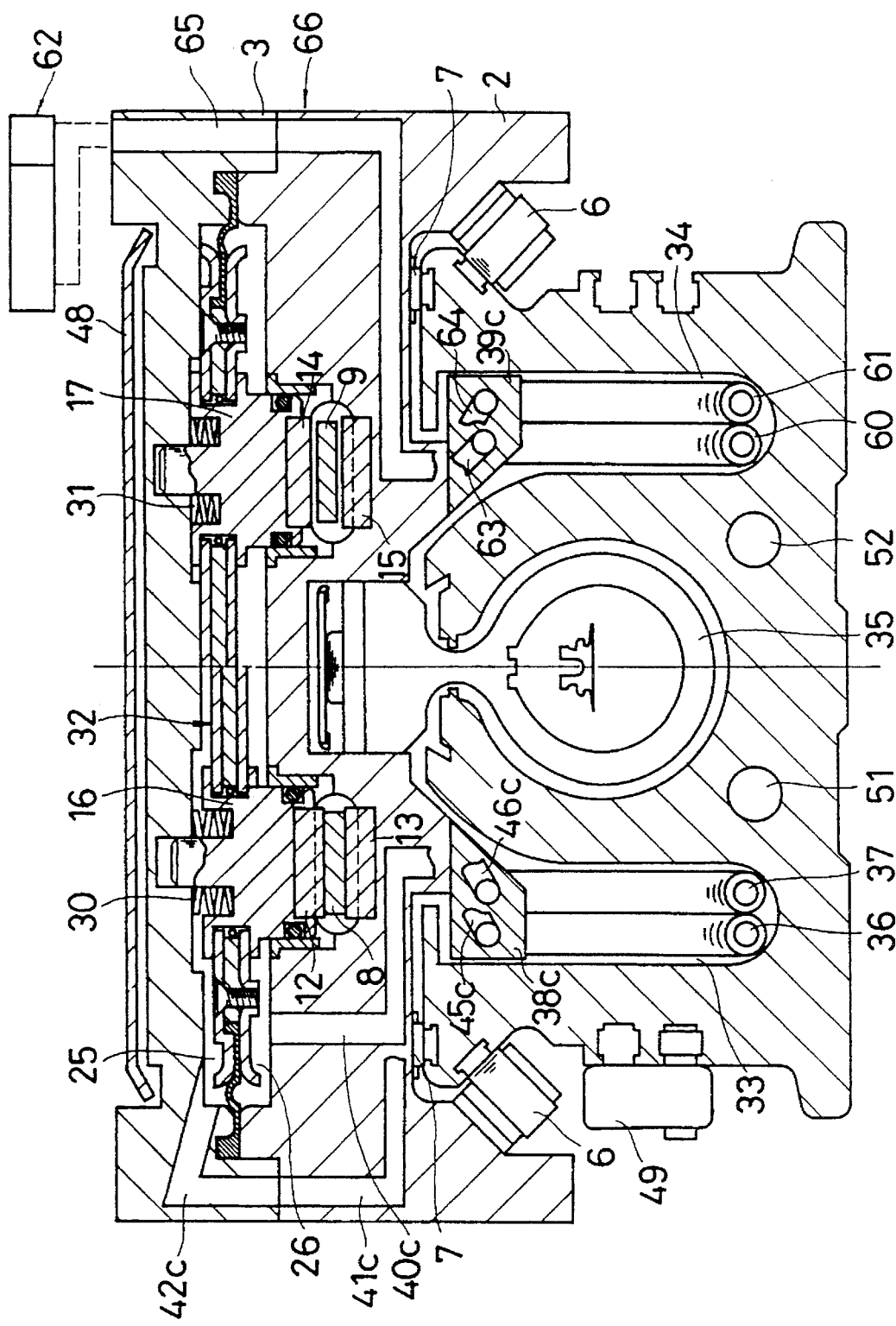
FIG. 6 is a longitudinal cross-sectional side view of a fifth embodiment of the invention.

Referring to FIG. 6, description is now given on the rodless cylinder unit with brake of a fifth embodiment of the present invention. The fifth embodiment is characterized in that the first air supply tube 36 and the second air supply tube 37 are accommodated in the slit 33, and a third air supply tube 60 and a fourth air supply tube 61 are accommodated in the slit 34.

The first air supply tube 36 and the second air supply tube 37 are accommodated in the slit 33, and these tubes are communicated with the lower air chamber 26 and the upper air chamber 25 as in the fourth embodiment (FIG. 5). In the fifth embodiment, an air cylinder 62 is connected to upper portion of the table 3, and the air cylinder 62 is used for various operations. The other ends of the third air supply tube 60 and the fourth air supply tube 61 accommodated in the slit 34 are communicated with a directional control valve (not shown) in the same manner as the first air supply tube 36 and the second air supply tube 37. Each one end of the third air supply tube 60 and the fourth air supply tube 61 is communicated with passages 63 and 64 of a joint 39c respectively and is communicated with both ends of the air cylinder 62 through a piping 65 provided on the slider 2 and the table 3. In the other aspects, the fifth embodiment has the same arrangement as the first embodiment, and the same symbol as in the first embodiment is used in FIG. 6, and detailed description is not given here.

Figure 7:
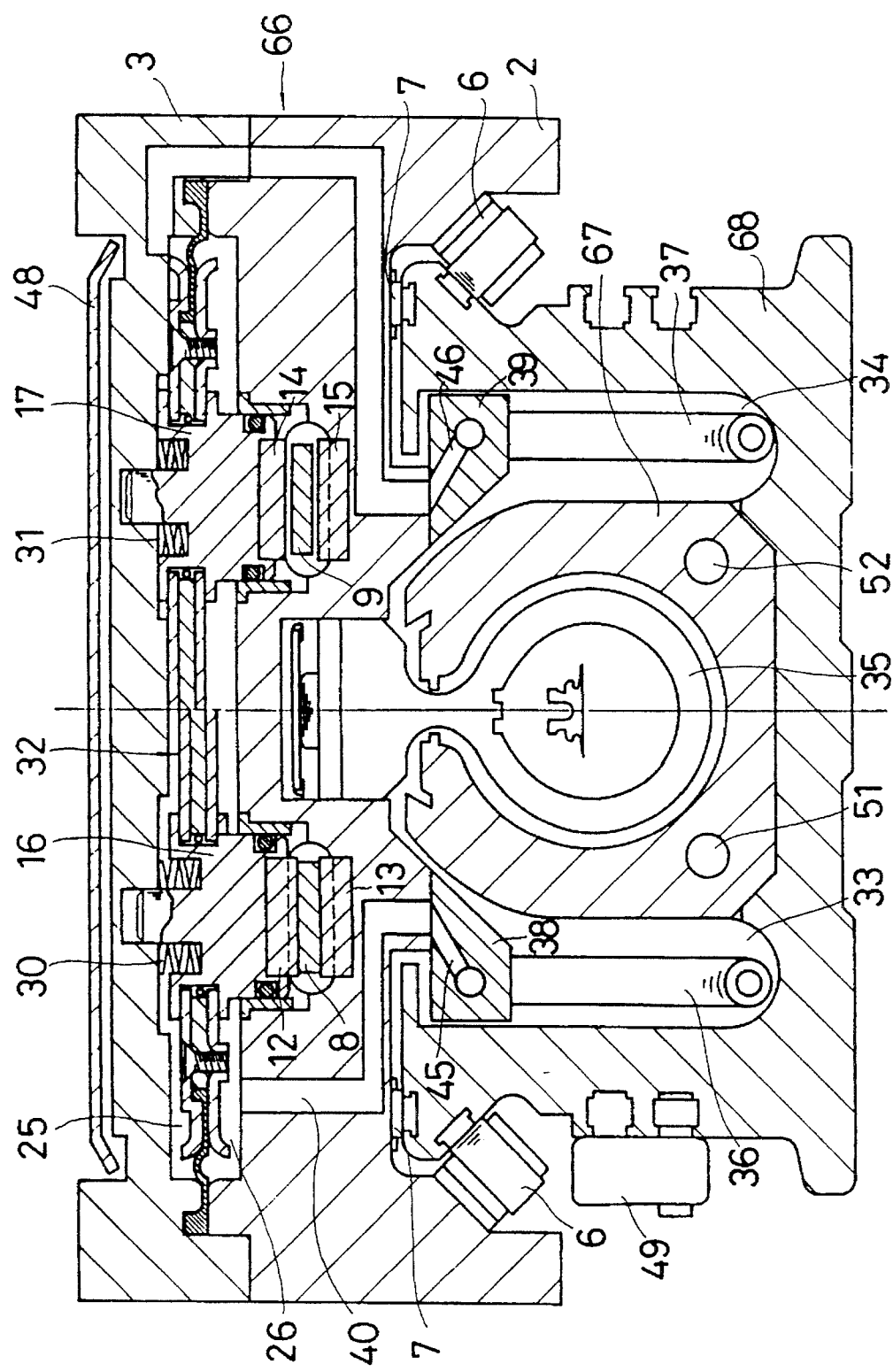
FIG. 7 is a longitudinal cross-sectional side view of a sixth embodiment of the present invention.

Referring to FIG. 7, description is now given on the rodless cylinder unit with brake of a sixth embodiment of the present invention. In the sixth embodiment, the cylinder tube 1 of the first embodiment is divided into a cylinder tube 67 and a guide 68 to facilitate manufacture. In the other aspects, the sixth embodiment has the same arrangement as in the first embodiment. Thus, the same symbol as in the first embodiment is used in FIG. 7, and detailed description is not given here.

Referring to FIG. 8 to FIG. 15, description is now given on the rodless cylinder unit with brake of a seventh embodiment of the present invention. In the seventh embodiment, the same component as in the first embodiment is referred by the same symbol, and detailed description is not given. A table 3 is arranged above the slider 2, and a first diaphragm device 84, a plate 53 and a second diaphragm device 85 are placed into a space formed by the slider 2 and the table 3, and peripheral portions of these components are squeezed by the slider 2 and the table 3. Brake holders 16b and 17b are provided with a portion with smaller diameter 90, an annular engagement groove 111 and an annular engagement groove 112 with spacings from below in this order (FIG. 15), and the brake holders 16b and 17b are inserted into four holes of the plate 53 in airtight condition. The first diaphragm device 84 is engaged with and connected to the portion with smaller diameter 90 on lower portion of the brake holders 16b and 17b, and the second diaphragm device 85 is engaged with and connected to the annular engagement groove 112 on upper portion of the brake holders 16b and 17b under airtight condition. A manual plate 103 as described later can be engaged with the annular engagement groove 111. Under the first diaphragm device 84 and the second diaphragm device 85, a first air chamber 88 and a second air chamber 89 are formed, and four brake chambers 10 and 11 are formed below the first air chamber 88 in recesses of the slider 2.

In the brake chambers 10 and 11, each pair of brake shoes 12–13 and 14–15 are provided above and below the brake bands 8 and 9. Upper brake shoes 12 and 14 are fixed on the brake holders 16b and 17b by bolts 86, and lower brake shoes 13 and 15 are fixed on bottom surface of the brake chambers 10 and 11 by bolts 87. Lower portions of the brake holders 16b and 17b are slidably and airtightly engaged with recesses of the slider 2, and a spring holder 18 above the brake holders 16b and 17b is slidably engaged with recesses of the table 3. Thus, the brake holders 16b and 17b are not deviated or do not become unstable. Outer peripheries of a first diaphragm 91 and a second diaphragm 92 of the first diaphragm device 84 and the second diaphragm device 85 are squeezed between the slider 2 and the plate 53 and betweeen the plate 53 and the table 3, and inner peripheries of the first diaphragm 91 and the second diaphragm 92 are squeezed by two diaphragm shells. On upper surfaces of the brake holders 16b and 17b, annular holes with open upper ends are formed, and springs 30 and 31 are inserted into these annular holes. Upper ends of the springs 30 and 31 contact with inner upper walls of the table 3 and apply downward resilient force on the first and the second diaphragm devices 14 and 15.

On both sides of the rodless cylinder 35 in the cylinder tube 1, elongated slits 33 and 34 with open upper ends are formed along the cylinder tube 1, and an air tube 37 and the like are accommodated or placed in the slit 34. On lower surface of the slider 2, protruding into the slit 34, a joint 39 is connected. A passage 41 communicating a passage in the joint 39 with the first air chamber 88 and the second air chamber 89 is formed in the slider 2 and the table 3. One end of the air tube 37 is connected to a passage in the joint 39 using a coupling, and the other end of the air tube 37 is connected to an air inlet 47 of a first head cover 4 using a coupling. Similarly, the air also can be supplied to the chambers above the first diaphragm device 84 and the second diaphragm device 85.

An air passage 93 with circular cross-section is formed at the center of the cylinder tube 1, and a slit with a predetermined width is formed above the air passage 93. Upper and lower surfaces of the slit are sealed by an upper flexible band 94 and a lower flexible band 95, and both ends of the upper flexible band 94 and the lower flexible band 95 are fixed on the first head cover 4 and the second head cover 5. By the pressure of the air applied on lower surface of the lower flexible band 95, the lower flexible band 95 is pushed into a groove on lower portion of the slit, preventing leakage of the air in the air passage 93. The upper flexible band 94 is considerably wider than the slit, and the wider upper flexible band 94 extensively covers upper surface of the slit and prevents intrusion of foreign objects into the slit. Into concave groove of the slider 2, upper portion of a port guide 97 is inserted and connected, and scrapers 98 are connected to both ends of the concave groove. In the air passage 93, a slide block is connected to lower end of the port guide 97. Because port block is connected to a sliding table 66, when the port guide 97 moves in the air passage 93, the port block and the sliding table 66 are moved. On each end of the slide block, a wear ring 99 and a piston cover 100 are connected respectively, and a blind hole 101 with an open end is formed on each of the piston covers 100. On each end wall of the air passage 93, a trunk projection 102 is protruding, and the passage in the trunk projection 102 is communicated with an air source or the atmosphere through a control valve. The blind hole 101 and the trunk projection 102 provide buffering at stroke end of the slide block.

Figure 8:
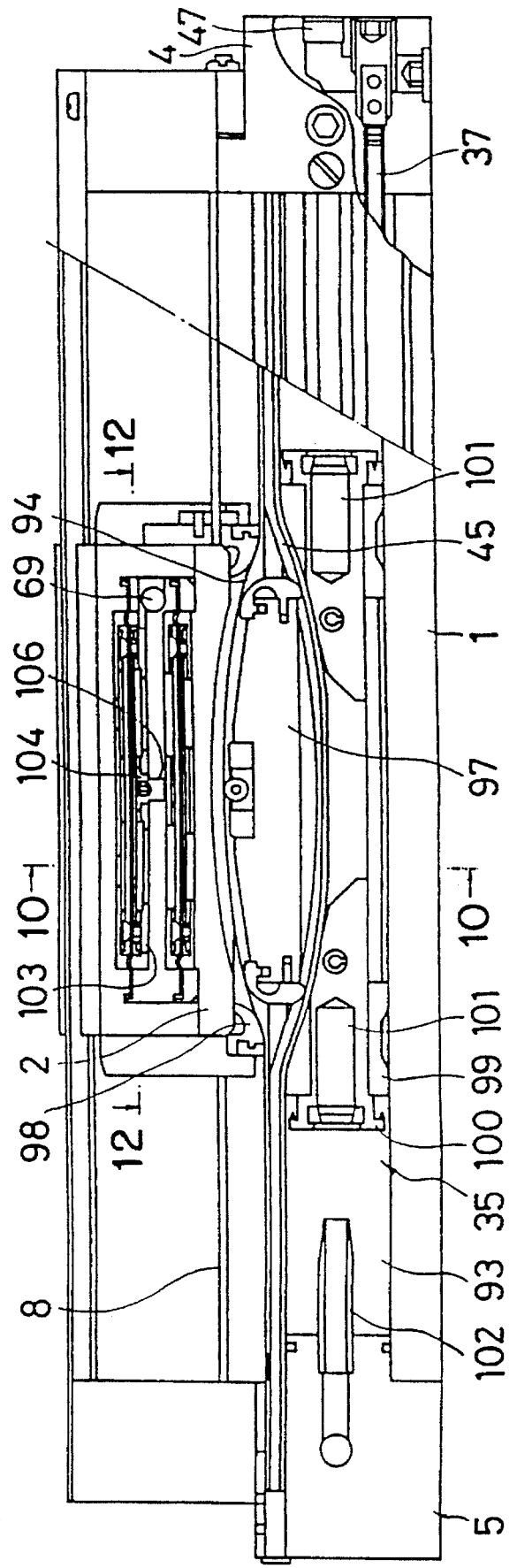
FIG. 8 is a partial cross-sectional side view of a seventh embodiment of the present invention.
Figure 9:
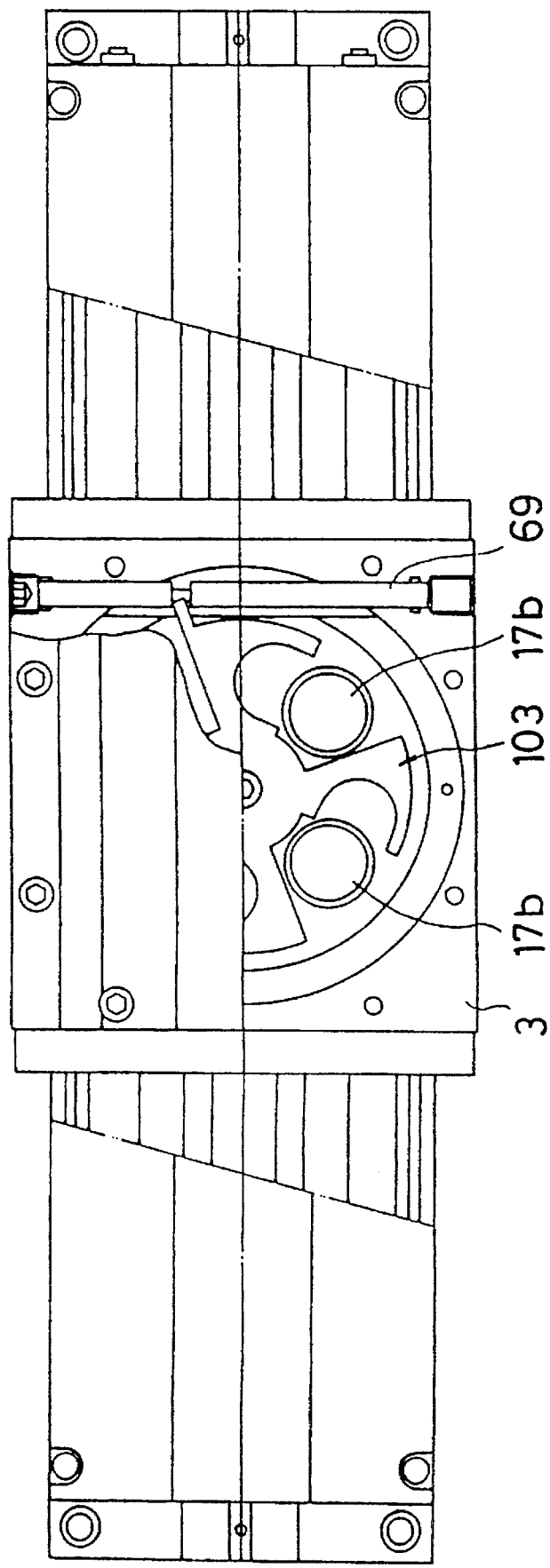
FIG. 9 is a partial cross-sectional plan view of the seventh embodiment of the invention.
Figure 10:
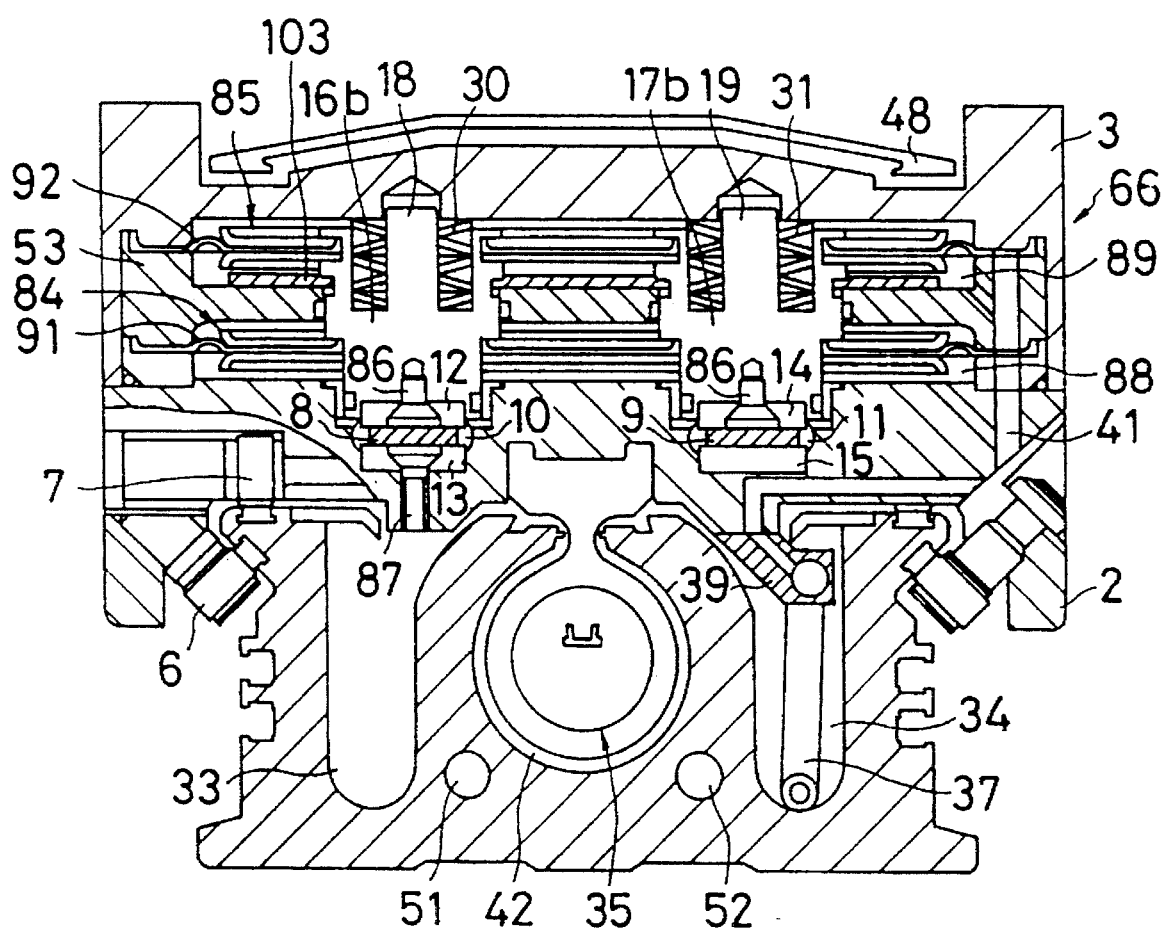
FIG. 10 is a cross-sectional view along the line 10—10 of FIG. 8, showing the brake in operation ("manual off")
Figure 11:
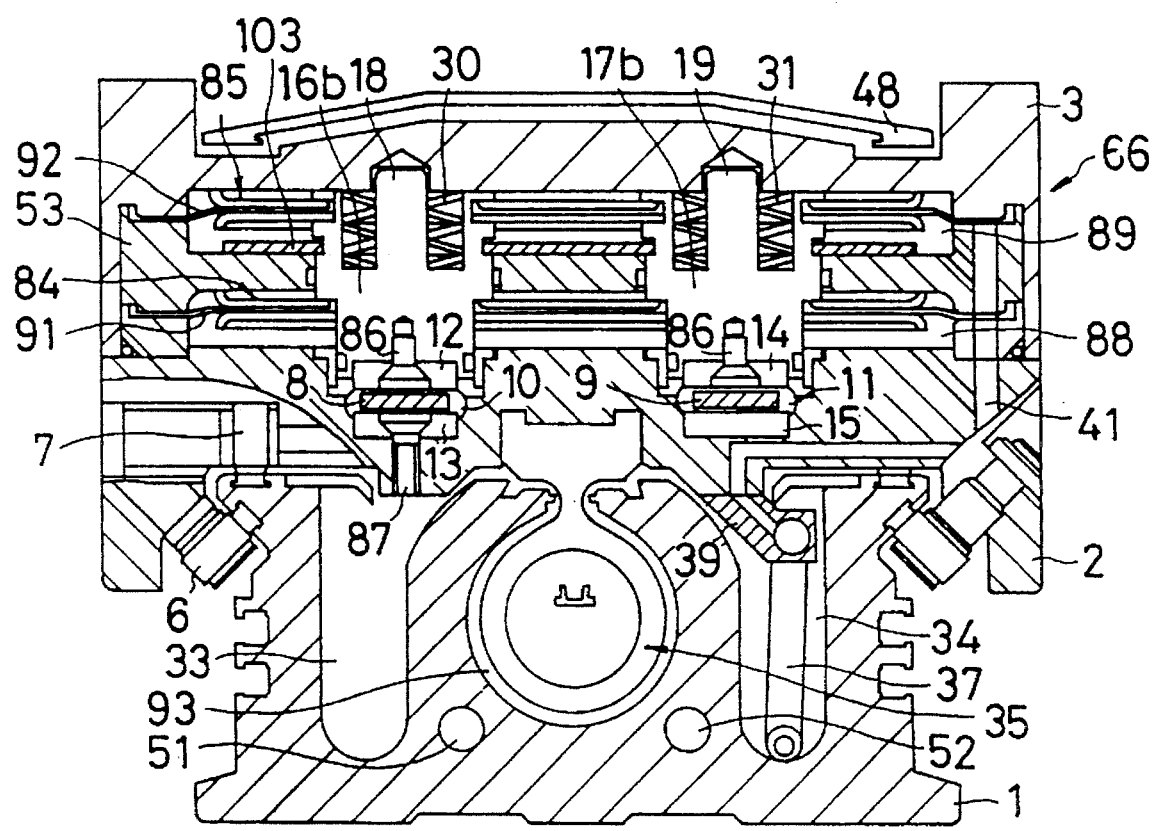
FIG. 11 is a cross-sectional view along the line 10—10 of FIG. 8, showing the brake in released state ("manual on")
Figure 12:
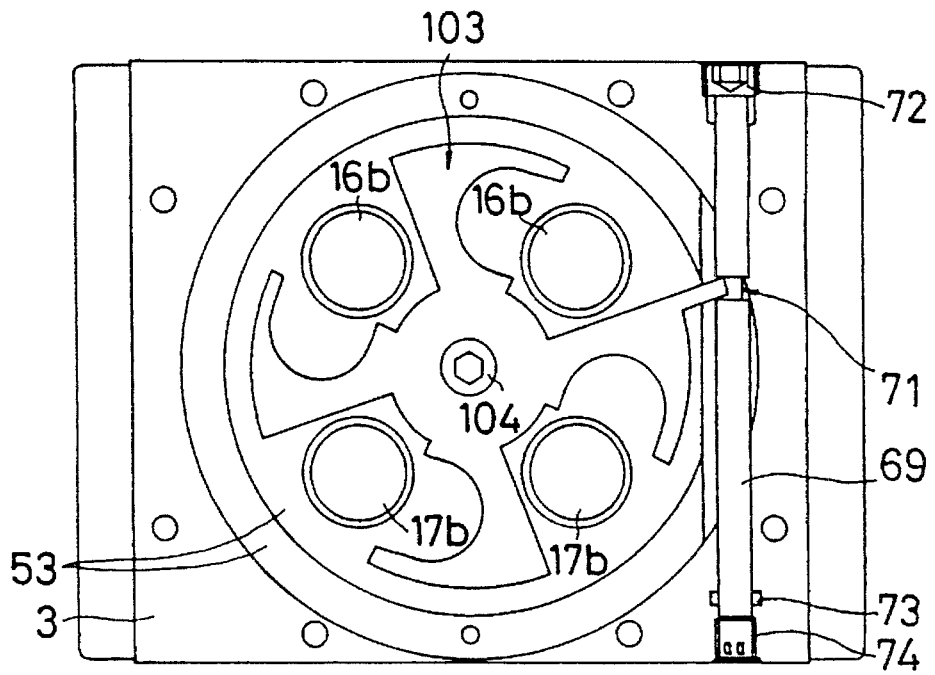
FIG. 12 is a cross-sectional view along the line 12—12 of FIG. 8, showing "manual off" state.

Above the plate 53 in the second air chamber 89 of the sliding table 66, a manual plate 103 of swastika shape in plan view is arranged. As shown in FIG. 8, a bolt 104 with flange is integrated with screwed portions of medium and small diameters below the flange, and a blind hole to engage with a hexagon tool is formed at upper center of the bolt 104. The portion with medium diameter of the bolt 104 is engaged with a center hole 105 of a manual plate 103, and the smaller diameter portion of the bolt 104 is screwed into a central tapped hole 106 of the plate 53. The manual plate 103 is maintained in rotatable state. The manual plate 103 is provided with 4 (a plurality of) hooked parts 107, extending in four (a plurality of) directions from the center by a predetermined distance and extending rightward in plan view. On the right (right from the center) of each hooked part 107, a semicircular hook 108 is formed, which is designed in such shape as to be easily engaged with annular engagement grooves 111 of the brake holders 16b and 17b. On outer portion of one of four hooked parts 107, a projection 109 for operation is provided. Although the manual plate 103 is arranged in the second air chamber 89 in this example, the manual plate 103 may be provided in the first air chamber 88.

On a side of the manual plate 103 in the sliding table 66, an insert aperture 70 extending perpendicularly to axial direction of the cylinder tube 1 is formed, and a plug 72 is screwed into one end of the insert aperture 70 to seal it. A female screw 74 is formed on the other end of the insert aperture 70, and a manual rod 69 with male screw 79 on its base is inserted from the other end of the insert aperture 70. The manual rod 69 is rotated by one turn (tightening direction) and is engaged with the female screw 74. On rear end of the manual rod 69, a blind hole to engage hexagon tool is formed. When the manual rod 69 is rotated in the other direction (loosening direction) by engaging a tool into this blind hole, the male screw 79 on the base of the manual rod 69 is disengaged from the female screw 74. A seal 73 is provided on annular groove on the other end of the insert aperture 70 to seal between the insert aperture 70 and the manual rod 69. An annular groove 71 is formed in the middle of the manual rod 69, and the projection 109 of the manual plate 103 is engaged with the groove 71. In normal case, the manual plate 103 is at the position shown in FIG. 12 (where the hook 108 of the manual plate 103 is not engaged with the annular engagement grooves 111 of the brake holders 16b and 17b), and the brake can be operated.

Description is now given on the function of the manual plate of the rodless cylinder unit with brake of the seventh embodiment. For example, it is often desired to keep the brake in released state for relatively long period during initial adjustment of the rodless cylinder unit with brake. In such case, under the condition of FIG. 12 ("manual off"), the air higher than a predetermined pressure is supplied to a first air chamber 88 and a second air chamber 89 through a control valve (not shown), an air inlet 47 of a head cover 4, an air tube 37, a joint 39 and a passage 41 of a sliding table 66. An upward force is generated by the air pressure, and a first diaphragm device 84, a second diaphragm device 85 as well as brake holders 16b and 17b are lifted upward against resilient force of springs 30 and 31. When the brake holders 16b and 17b are sufficiently moved upward, gaps are generated between the brake bands 8 and 9 and upper and lower brake shoes 12–13 and 14–15. The brake is turned to released state, and the entire annular engagement grooves 111 of the brake holders 16b and 17b appear in the second air chamber 89 above the plate 53.

A tool (hexagon wrench) is engaged with the blind hole for engaging with hexagon tool of the manual rod 69, and the manual rod 69 is rotated in loosening direction. Thus, the engagement of the male screw 79 on the base of the manual rod 69 with the female screw 74 is disengaged, and the manual rod 69 is withdrawn to this side. Because the groove 71 of the manual rod 69 is engaged with the projection 109 of the manual plate 103, the manual plate 103 is rotated clockwise as the manual rod 69 is moved to this side. Since the thickness of the manual plate 103 is smaller than the vertical width of the annular engagement groove 111 and the annular engagement groove 111 is vertically coordinated with the manual plate 103, the four hooks 108 of the manual plate 103 engage with four annular engagement grooves 111 of the brake holders 16b and 17b by small operating force as the manual plate 103 is rotated. (From the state of FIG. 12 to the "manual on" state of FIG. 13.) In this way, the hooks 108 of the manual plate 103 are engaged with the annular engagement grooves 111, and even when the air is discharged from the first air chamber 88 and the second air chamber 89, the first diaphragm device 84, the second diaphragm device 85 and the brake holders 16b and 17b are locked, and the brake is maintained in released state. The maintenance of the released state of the brake depends upon material strength of the manual plate 103, and the manual plate 103 may be thin. Since the manual plate 103 may be thin and can be accommodated in the second air chamber 89, the space requirements are the same as in the conventional equipment even when the manual plate 103 is provided.

Figure 13:
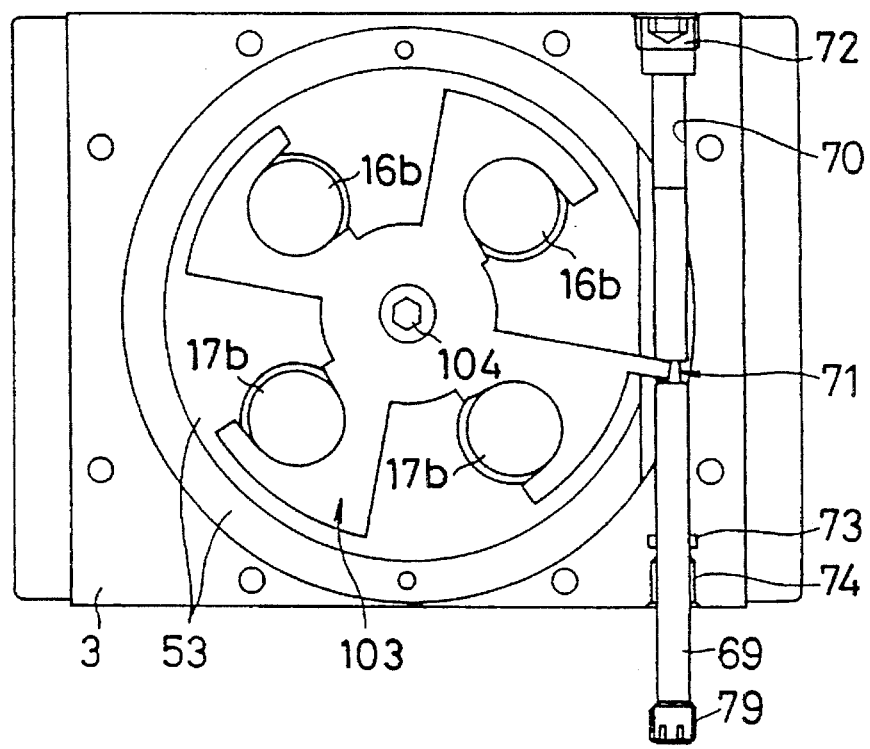
FIG. 13 is a cross-sectional view along the line 12—12 of FIG. 8, showing "manual on" state.
Figure 14:
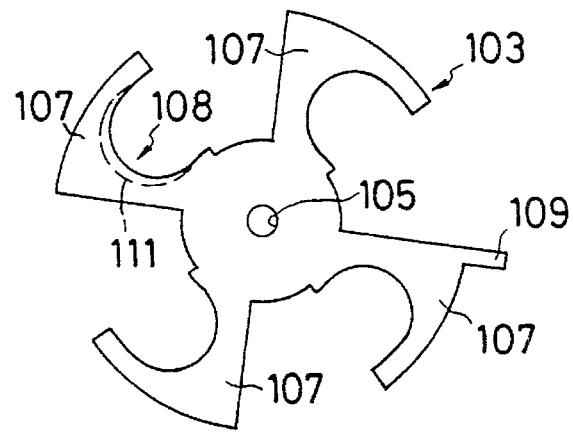
FIG. 14 is a plan view of a manual plate of the rodless cylinder unit with brake of the seventh embodiment of the invention.
Figure 15:
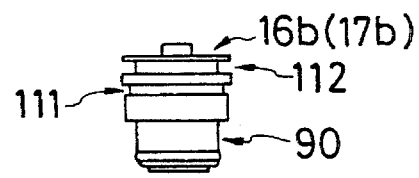
FIG. 15 is a side view of a brake holder of the rodless cylinder unit with brake of the seventh embodiment of the present invention.

When the initial adjustment of the rodless cylinder unit with brake has been completed, the air higher than the predetermined pressure is supplied to the first air chamber 88 and the second air chamber 89 through the tube 37 and the passage 41 under the conditions shown in FIG. 13. When upward force is generated by the air pressure and the brake holders 16b and 17b are moved up sufficiently, gaps are generated between the brake bands 8 and 9 and upper and lower brake shoes 12–13 and 14–15, and the brake is turned to released state. When the manual rod 69 is pushed in, the manual plate 103 is rotated counterclockwise in plan view as the manual rod 69 is moved. By the rotation of the manual plate 103, the engagement of four hooks 108 of the manual plate 103 with four annular engagement grooves 111 of the brake holders 16b and 17b is released. When the manual rod 69 is rotated in tightening direction and tip of the manual rod 69 is engaged with the female screw 74, the condition returns to that of FIG. 12. Next, when the air of the first air chamber 88 and the second air chamber 89 is discharged, the first diaphragm device 84 and the second diaphragm device 85 as well as the brake holders 16b and 17b are moved down by resilient force of the springs 30 and 31, and it is returned to the brake operating state.

Figure 16:
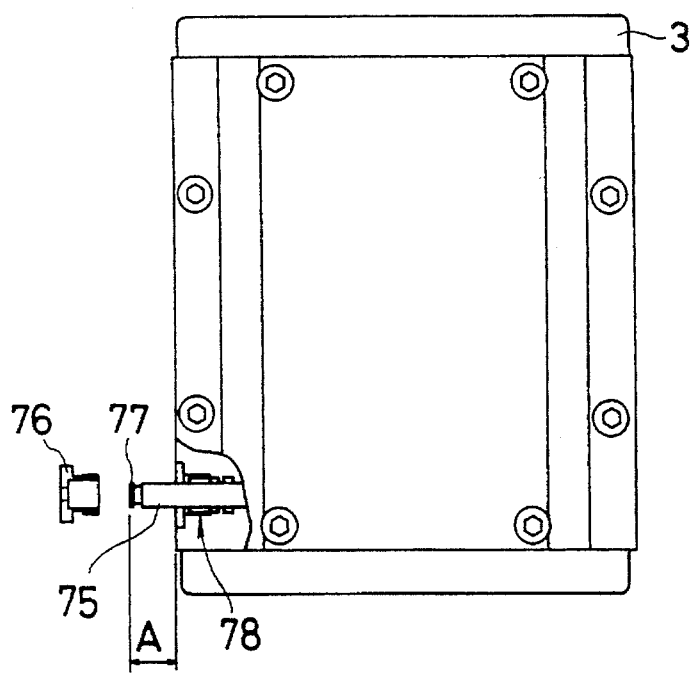
FIG. 16 is a partial cross-sectional plan view of a table of the rodless cylinder unit with brake of an eighth embodiment of the invention.

Description is given now on the rodless cylinder unit with brake of an eighth embodiment of the invention, referring to FIG. 16. The arrangement of the eighth embodiment is almost the same as that of the seventh embodiment, except that the structures of the manual rod 69 and the insert aperture 70 are different.

In the eighth embodiment, the manual rod 75 is a little shorter than the manual rod 69 of the seventh embodiment, and a collar 77 is formed on rear end. The tip of the manual rod 75 is not provided with male screw, and one end of the insert aperture 70 is not provided with female screw 74. A manual cap 76, comprising a flange and a tube, is provided with male screw on outer periphery of the tube, and a hexagon hole to engage with a tool is formed on the flange. A stepped aperture 78 to engage the manual cap 76 is formed in an opening on rear end of the insert aperture 70, and a female screw is formed on the portion with smaller diameter. Similarly to the seventh embodiment, a plug 72 is screwed on one end of the insert aperture 70 and is sealed, while a seal 73 is provided in annular groove on the other end of the insert aperture 70 to seal between the insert aperture 70 and the manual rod 75. An annular rod groove 71 is formed in the middle of the manual rod 75, and a projection 109 of the manual plate 103 is engaged with the rod groove 71.

The manual rod 75 is pushed in, and the manual cap 76 is screwed into the stepped aperture 78. A tool (hexagon wrench) is engaged with a hexagon hole of the manual cap 76 and is screwed in. In this case, (normal case), the manual plate 103 is at the position shown in FIG. 12 (where hooks 108 of the manual plate 103 and annular engagement grooves 111 of the brake holders 16b and 17b are not engaged), and the brake can be operated.

Description is now given on the function of the manual plate 103 of the rodless cylinder unit with brake of the eighth embodiment. For example, the air higher than a predetermined pressure is supplied to the first air chamber 88 and the second air chamber 89 through the air tube 37 and the passage 41 during initial adjustment of the rodless cylinder unit with brake. An upward force is generated by the air pressure, and the first diaphragm device 84, the second diaphragm devices 85 as well as the brake holders 16b and 17b are moved up against resilient force of the springs 30 and 31. When the brake holders 16b and 17b are moved up sufficiently, gaps are generated between the brake bands 8 and 9 and upper and lower brake shoes 12–13 and 14–15. Thus, the brake is turned to released state, and the entire annular engagement grooves 111 of the brake holders 16b and 17b appear in the second air chamber 89 above the plate 53.

A tool (hexagon wrench) is engaged in the blind hole to engage with a hexagon tool of the manual cap 76, and the manual cap 76 is rotated in loosenining direction to remove the manual cap 76 from the stepped aperture 78. Applying a screwdriver on the collar 77, the manual rod 75 is withdrawn to this side by a distance A. Because the rod groove 71 of the manual rod 75 is engaged with the projection 109 of the manual plate 103, the manual plate 103 is rotated clockwise as the manual rod 69 moves. By the rotation of the manual plate 103, the four hooks 108 of the manual plate 103 are engaged with the four annular engagement grooves 111 of the brake holders 16b and 17b. In this way, the hooks 108 of the manual plate 103 are engaged with the annular engagement grooves 111, and even when the air is discharged from the first air chamber 88 and the second air chamber 89, the first diaphragm device 84, the second diaphragm device 85 and the brake holders 16b and 17b are locked. Thus, the released state of the brake is maintained.

When the initial adjustment of the rodless cylinder unit with brake has been completed, the air higher than the predetermined pressure is supplied to the first air chamber 88 and the second air chamber 89 through the air tube 37 and the passage 41. When upward force is generated by the air pressure and the brake holders 16b and 17b are moved up sufficiently, gaps are generated between the brake bands 8 and 9 as well as the upper and lower brake shoes 12–13 and 14–15, and the brake is turned to released state. When the manual rod 75 is pushed in, the manual plate 103 is rotated counterclockwise as the manual rod 75 moves. By the rotation of the manual plate 103, the engagement of the four hooks 108 of the manual plate 103 with the four annular engagement grooves 11 of the brake holders 16b and 17b is released. When the manual cap 76 is screwed into the stepped aperture 78, the collar 77 of the manual rod 75 is located in the tube of the manual cap 76. Next, when the air in the first air chamber 88 and the second air chamber 89 is discharged, the first diaphragm device 84, the second diaphragm device 85 and the brake holders 16b and 17b are moved down by resilient force of the springs 30 and 31, and it is turned to brake operating state.

Figure 17:
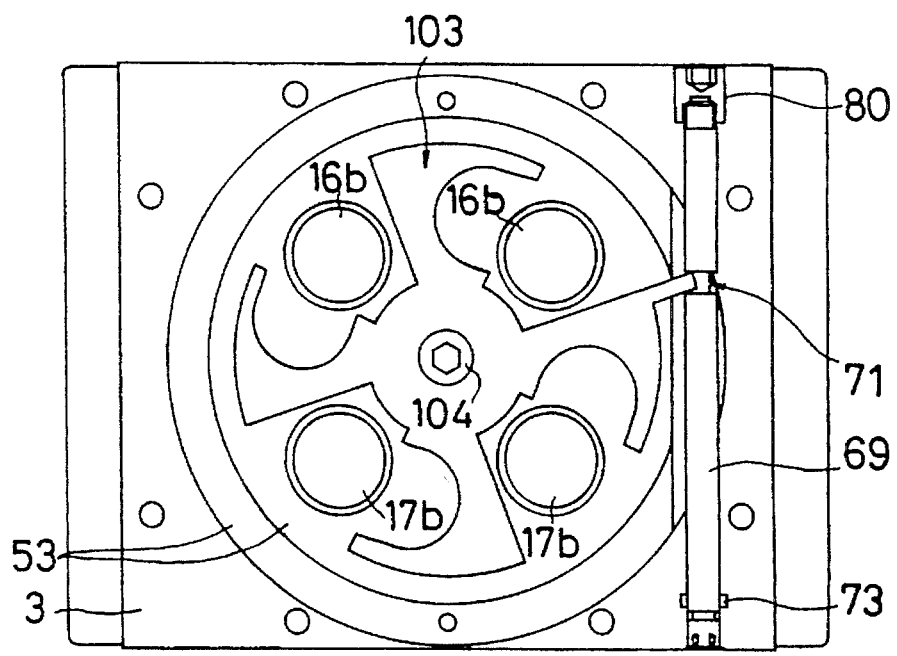
FIG. 17 is a cross-sectional view of the rodless cylinder unit with brake of a ninth embodiment of the invention, showing a part corresponding to FIG. 12.
Figure 18:
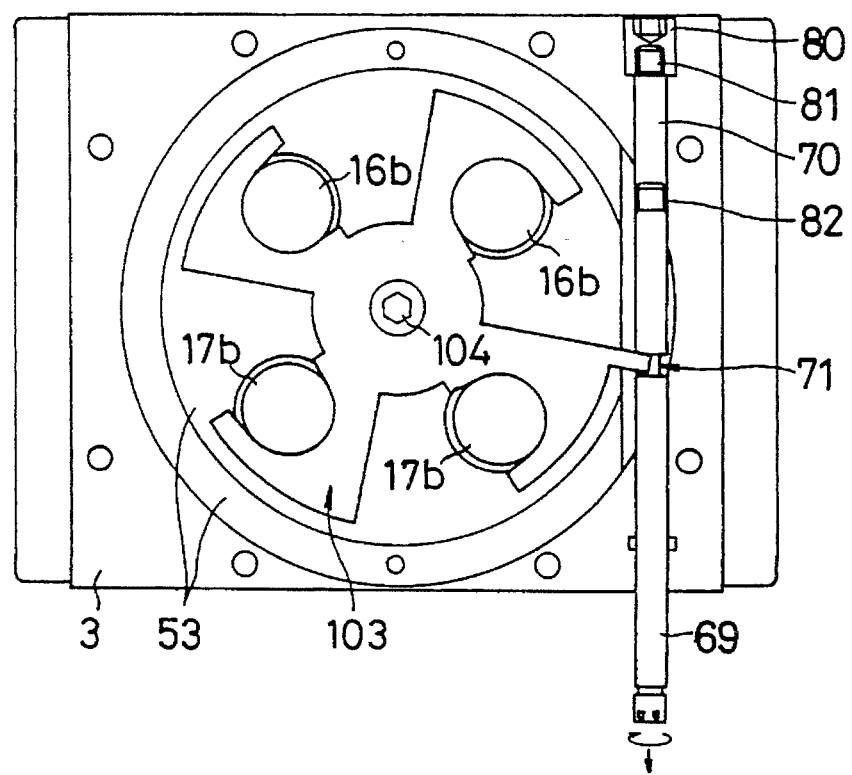
FIG. 18 is a cross-sectional view of the rodless cylinder unit with brake of the ninth embodiment of the present invention, showing a part corresponding to FIG. 13.

Description is given now on the rodless cylinder unit with brake of a ninth embodiment of the present invention, referring to FIG. 17 and FIG. 18. The ninth embodiment is exactly the same as the seventh embodiment, except that the structures of the manual rod 69 and the insert aperture 70 are different from the seventh embodiment. Here, description is given only on the difference, and the description on the same features is not given.

On a side of the manual plate 103 in the sliding table 66, an insert aperture 70 extending perpendicularly to axial direction of the cylinder tube 1 is formed. On one end of the insert aperture 70, a cap 80 is inserted, and it is sealed and fixed. On a hole of the cap 80 opened toward the insert aperture 70, a female screw 81 is provided, and a male screw 82 is formed on forward end of the manual rod 69. The manual rod 69 with the male screw 82 at its forward end is inserted from the other end of the insert aperture 70. The manual rod 69 is rotated in one direction (tightening direction) and is engaged with the female screw 81. When the manual rod 69 is rotated in the other direction (loosening direction), the engagement of the male screw 82 on forward portion of the manual rod 69 with the female screw 81 is released.

Description is given now on the rodless cylinder unit with brake of a tenth embodiment of the present invention, referring to FIG. 19 to FIG. 23. The tenth embodiment is characterized in that there is provided an air tube holder, which prevents jumping of the air tube in the slit and perfectly holds the air tube within the slit. In the tenth embodiment, the same component as in the second embodiment is referred by the same symbol, and detailed description is not given.

Figure 19:
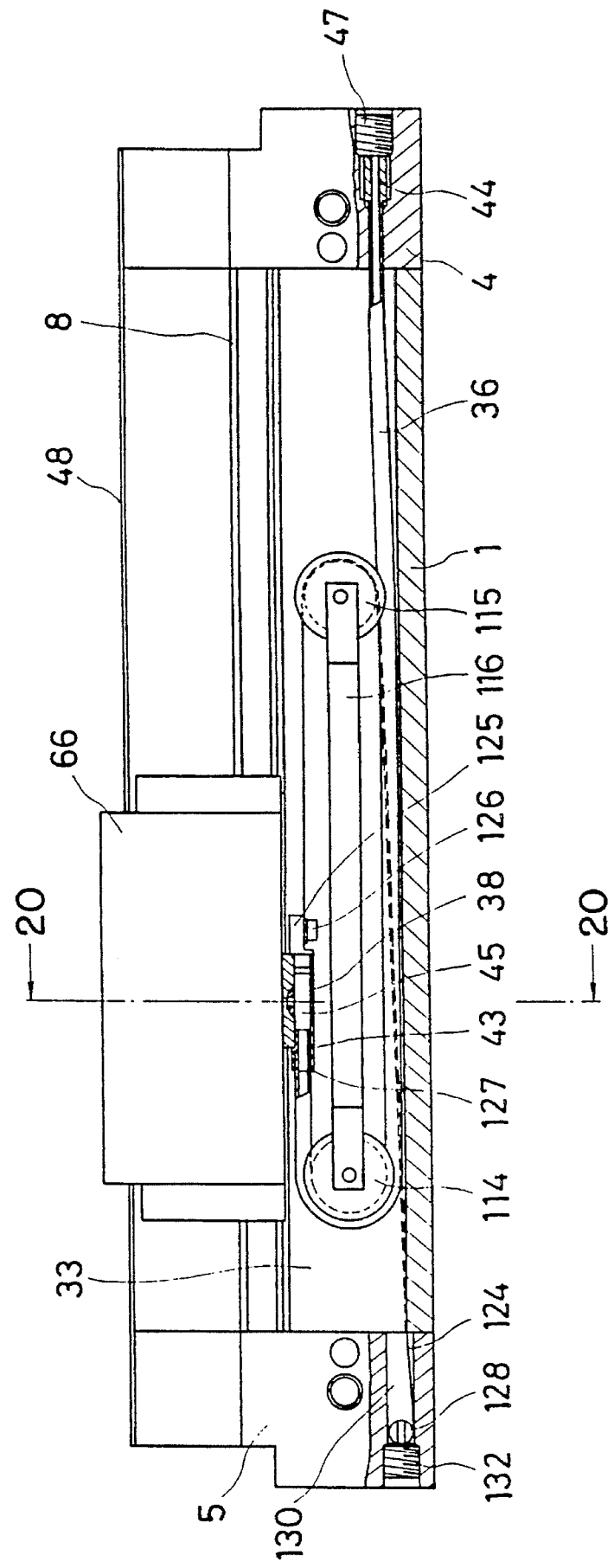
FIG. 19 is a partial cross-sectional side view of the rodless cylinder unit with brake of a tenth embodiment of the invention.
Figure 20:
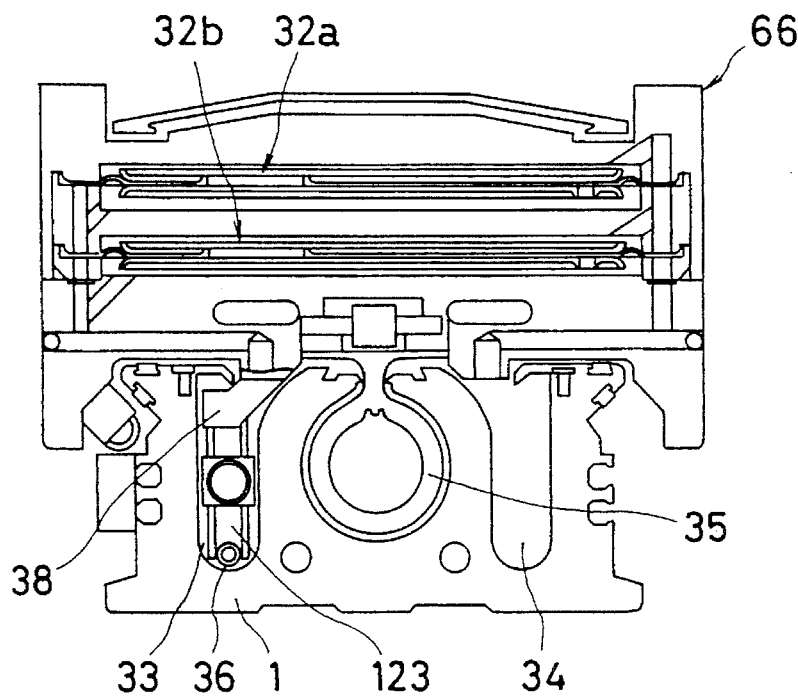
FIG. 20 is a cross-sectional view along the line 20—20 of FIG. 19.
Figures 21A, 21B:
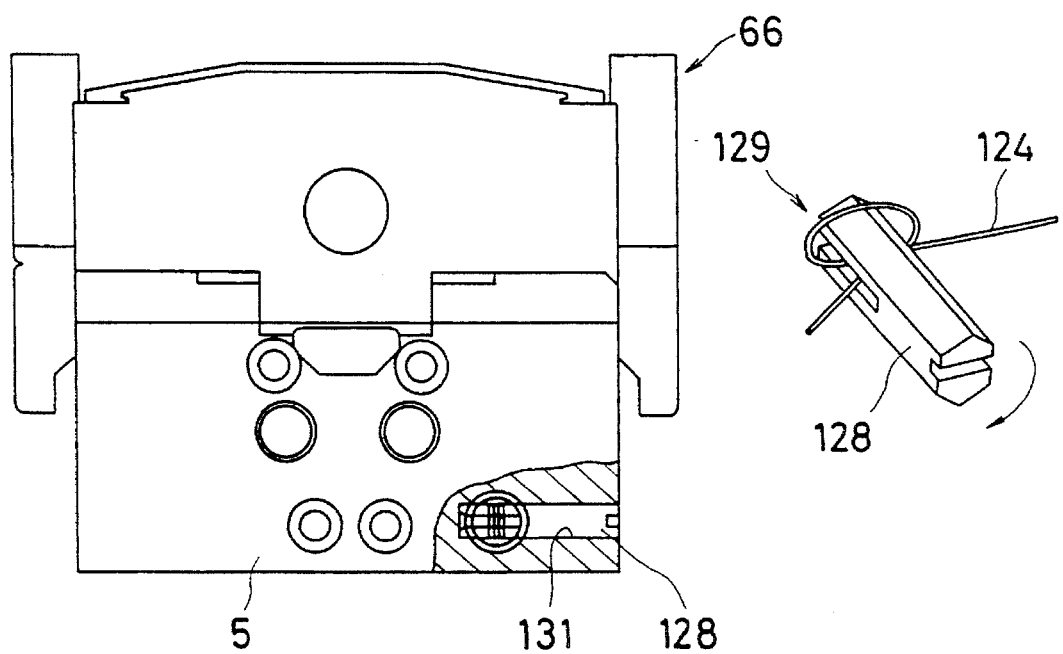
FIG. 21 (a) is a left side view of FIG. 19, and FIG. 21 (b) is a perspective view of a tension bolt.
Figure 22A:
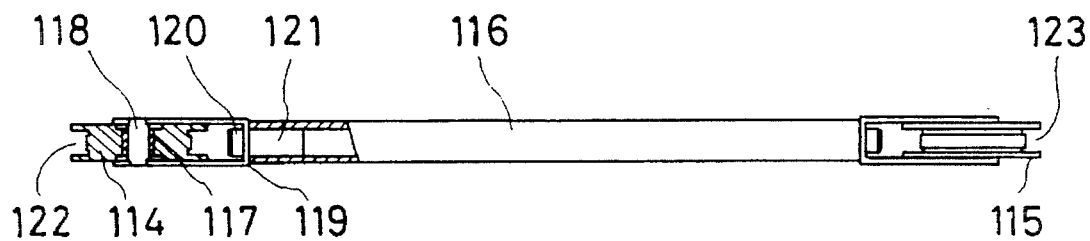
FIG. 22 (a) is a partial cross-sectional plan view of an air tube holder.
Figure 22B:
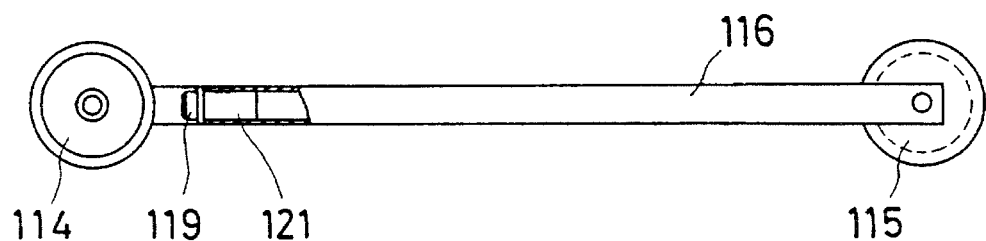
Figure 23A:
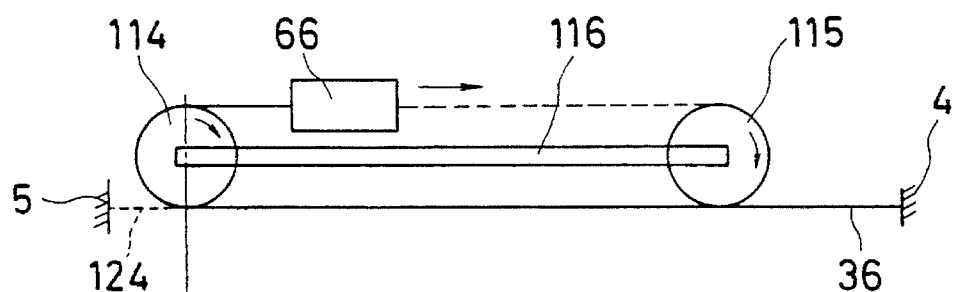
FIG. 23 shows operating principle of the tenth embodiment of the present invention.
Figure 23B:
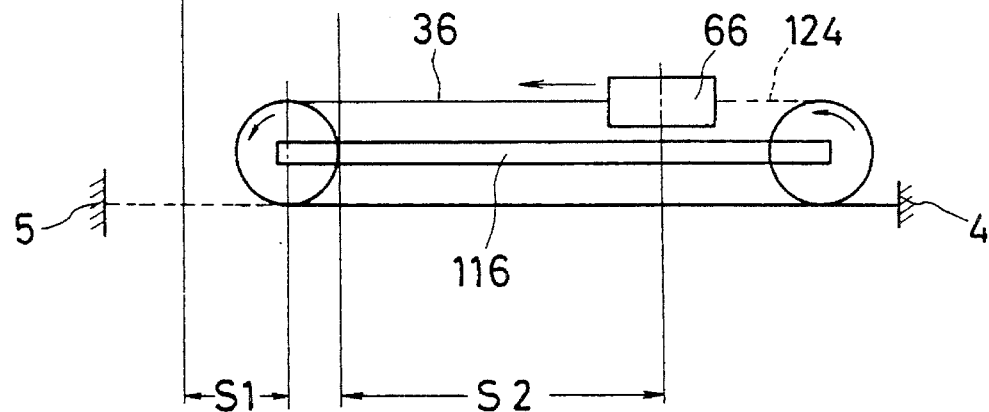
Figure 24:
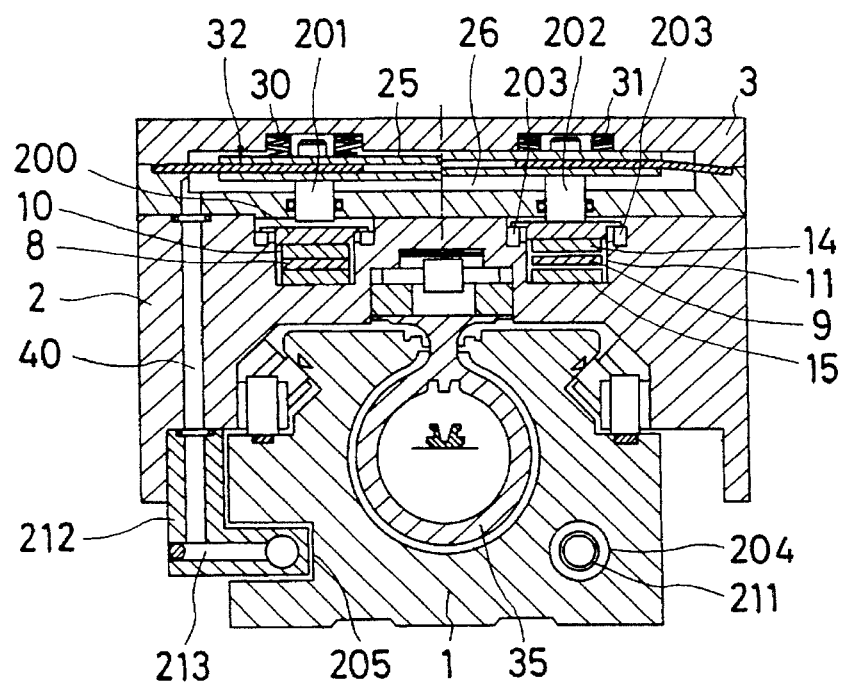
FIG. 24 is a longitudinal cross-sectional side view of the rodless cylinder unit with brake of a prior application (not well-known in the art)
Figure 25:
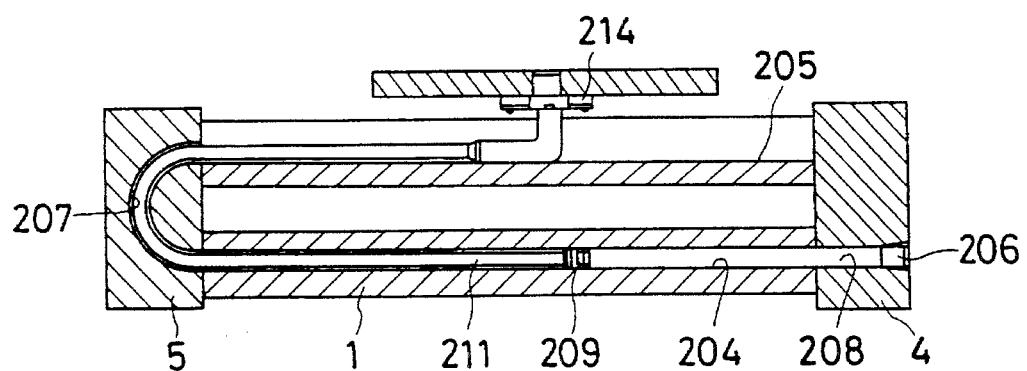
FIG. 25 is a cross-sectional view along the line 25—25 of FIG. 24.
Figure 26:
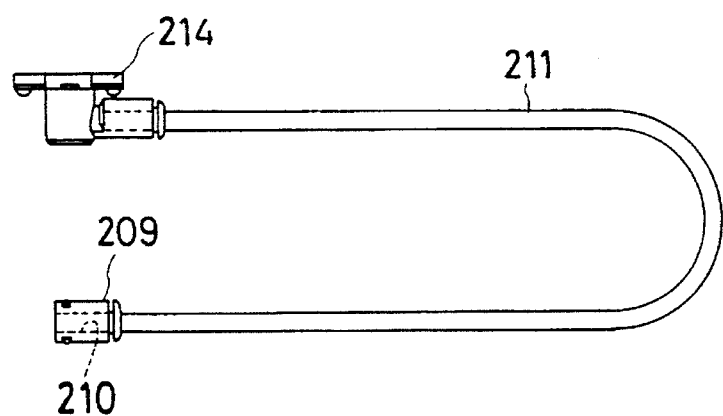
FIG. 26 shows an air tube in FIG. 25.

FIG. 22 shows the air tube holder to be used in the tenth embodiment. The air tube holder comprises a first guide roller 114 and a second guide roller 115, and the first guide roller 114 is rotatably supported on a guide pin 118 through a bush 117. Both ends of the guide pin 118 are fixed on one end of two-forked portion of the holder 119 (the left end in FIG. 22), and the other end of the holder 119 (the right end in FIG. 22) is fixed on one end (left end in FIG. 22) of a tubular guide rod 116 by means of a bolt 120 and a joint nut 121. A second guide roller 115 is also fixed on the other end of the guide rod 116 by the same procedure as the first guide roller 114. FIG. 19 to FIG. 21 show the air tube holder of FIG. 22 placed in a slit 33. A first air supply tube 36 is engaged in an annular groove 122 on outer periphery of a first guide roller 114, and a cable 124 is engaged in an annular groove 123 on outer periphery of the second guide roller 115. A joint 38 is connected to a projection on lower surface of the sliding table 66 protruding into the slit 33. One end of a first air supply tube 36 is connected to a passage 45 in the joint 38 using a coupling 43 and a joint ring 127, and the other end of the first air supply tube 36 is connected to an air inlet 47 of the first head cover 4 using a coupling 44. One end of the cable 124 is fixed on right end of the air joint 38 by means of a cable holder 125 and a cable mounting bolt 126, and the other end of the cable 124 is guided into an insert aperture 130 of the second head cover 5 and is inserted into a slit 129 of a tension bolt 128. As shown in FIG. 21 (*b*), the other end of the cable 124 is inserted into the slit 129 and is then turned around the surface of the tension bolt 128, and is further inserted into the slit 129. The tension bolt 128 is placed in a lateral hole 131 perpendicular to the insert aperture 130. When the tension bolt 128 is rotated, the other end of the cable 124 is pulled toward the second head cover 5. When the other end of the cable 124 engaged in the annular groove 123 of the second guide roller 115 is pulled toward the second head cover 5, the air tube holder is moved toward the second head cover 5. By this movement, the first air supply tube 36 engaged with the first guide roller 114 is pulled toward the second head cover 5 and is stretched. With a certain tension applied on it, there is no more loosening present on the first air supply tube 36. In this case, a locking bolt 132 is screwed into the screw hole at the end of the insert aperture 130. The locking bolt 132 is pressed on the tension bolt 128 to prevent loosening of the cable 124 and the first air supply tube 36. It is also possible to prevent loosening of the second air supply tube 37 and the transmission cable 55 by arranging an air tube holder in the slit 34 of FIG. 1, FIGS. 3–5, FIG. 6, FIG. 10, and FIG. 11, or two air tube holders can be provided each in the slit 33 and the slit 34 shown in FIG. 6.

Description is now given on the operation of the rodless cylinder unit with brake of the tenth embodiment of the present invention. When the sliding table 66 is moved from the position of FIG. 19 (*a*) to the position of FIG. 19 (*b*), the air tube holder is also moved as it is pulled by the first air supply tube 36 and the cable 124. Each end of the first air supply tube 36 and the cable 124 is fixed on the sliding table 66 respectively and is laid over outer peripheries of the first guide roller 114 and the second guide roller 115, and the other ends of the first air supply tube and the cable 124 are fixed on the first head cover 4 and the second head cover 5 respectively. Thus, the moving distance S1 of the sliding table 66 is twice as long as the moving distance S2 of the air tube holder and the first guide roller 114. On the first air supply tube 36, the same tension is applied before and after the movement. Thus, regardless of which position the sliding table 66 is moved to, the same tension is applied always on the first air supply tube 36. Because the air tube holder comprising the first guide roller 114, the second guide roller 115 and the guide roller 116 possesses considerable mass, the first air supply tube 36 maintains the conditions shown in FIG. 19 and FIG. 23, and it neither is caught within the slit 33 nor jumps out of it.

What we claim is:

1. A rodless cylinder unit comprising an elongated cylinder tube having a first end and a second end, a table slidably supported by the cylinder tube for longitudinal movement, at least one brake band extending longitudinally of the cylinder tube and affixed adjacent the ends of the cylinder tube, pneumatic brake means carried by the table and operable to selectively engage the brake band and disengage from the brake band, the brake means being operable by air pressure supplied through a flexible air supply tube and including a diaphragm unit carrying a brake shoe for selective engagement with the brake band and defining with a portion of the table a pressure chamber, a passage in the table communicating with the pressure chamber, the air supply tube having an outlet end connected to the passage and an inlet end connected to the first end of the cylinder tube, and an elongated first slit in the cylinder tube, the first slit being open along its length at an external wall of the cylinder tube, the first slit receiving the air supply tube and the air supply tube being formed with a U-shaped loop portion of variable extent, depending on the position of the table on the cylinder tube, the loop portion being received in a portion of the first slit remote from the inlet end of the air supply tube.

2. A rodless cylinder unit according to claim 1 and further comprising a head cover at each end of the cylinder tube, and wherein each end of the brake band is connected to a head cover, and the inlet end of the air supply tube is connected to one of the head covers.

3. A rodless cylinder unit according to claim 1 wherein a portion of the passage is in a fitting on the table, the outlet end of the air supply tube is connected to the fitting, and a portion of the fitting extends into the first slit.

4. A rodless cylinder unit according to claim 3 wherein the fitting has a leg portion to which the outlet end of the air supply tube is coupled that extends longitudinally of the first slit and the passage portion in the fitting opens to the air supply tube in direction away from the inlet end of the air supply tube.

5. A rodless cylinder unit comprising an elongated cylinder tube having a first end and a second end, a table slidably supported by the cylinder tube for longitudinal movement, at least one brake band extending longitudinally of the cylinder tube and affixed adjacent the ends of the cylinder tube, pneumatic brake means carried by the table and operable to selectively engage the brake band and disengage from the brake band, the brake means being operable by air pressure supplied through a flexible air supply tube, the air supply tube having an outlet end connected to the brake means and an inlet end connected to the first end of the cylinder tube, an elongated first slit in the cylinder tube, the first slit being open along its length at an external wall of the cylinder tube, the first slit receiving the air supply tube and the air supply tube being formed with a U-shaped loop portion of variable extent, depending on the position of the table on the cylinder tube, the loop portion being received in a portion of the first slit remote from the inlet end of the air supply tube, an elongated second slit in the cylinder tube, the second slit being open along its length at an external wall of the cylinder tube, and a flexible transmission cable received in said second slit in the cylinder tube, one end of the cable leading from the first end of the cylinder tube and the other end being coupled to a device carried by the table, the cable being formed with a U-shaped loop portion of variable extent, depending on the position of the table on the cylinder tube, the loop portion being received in a portion of the second slit remote from the first end of the cylinder tube.

6. A rodless cylinder unit according to claim 5 and further comprising a first guide roller and a second guide roller received in the slit, a coupling member carrying the guide rollers in spaced apart relation longitudinally of the slit with the first guide roller closer to the first end of the cylinder tube, the guide rollers and coupling member being movable along the slit, and a cable having one end attached to the table, having a portion trained around the first roller, and having its other end attached to the second end of the cylinder tube, and wherein the U-shaped loop portion of the transmission cable is trained around the second guide roller.

7. A rodless cylinder unit comprising an elongated cylinder tube having a first end and a second end, a table slidably supported by the cylinder tube for longitudinal movement, at least one brake band extending longitudinally of the cylinder tube and affixed adjacent the ends of the cylinder tube, pneumatic brake means carried by the table and operable to selectively engage the brake band and disengage from the brake band, the brake means being operable by air pressure supplied through a flexible air supply tube, the air supply tube having an outlet end connected to the brake means and an inlet end connected to the first end of the cylinder tube, an elongated first slit in the cylinder tube, the first slit being open along its length at an external wall of the cylinder tube, the first slit receiving the air supply tube and the air supply tube being formed with a U-shaped loop portion of variable extent, depending on the position of the table on the cylinder tube, the loop portion being received in a portion of the first slit remote from the inlet end of the air supply tube, a first guide roller and a second guide roller received in the first slit, a coupling member carrying the guide rollers in spaced apart relation longitudinally of the first slit with the first guide roller closer to the first end of the cylinder tube, the guide rollers and coupling member being movable along the first slit, and a cable having one end attached to the table, having a portion trained around the first roller, and having its other end attached to the second end of the cylinder tube, the U-shaped loop portion of the air supply tube being trained around the second guide roller.

* * * * *